United States Patent
Yu et al.

(10) Patent No.: US 12,309,783 B2
(45) Date of Patent: May 20, 2025

(54) METHOD FOR REPORTING BUFFER STATUS REPORT AND COMMUNICATIONS APPARATUS

(71) Applicant: Huawei Technologies Co., Ltd., Shenzhen (CN)

(72) Inventors: Chang Yu, Shenzhen (CN); Junren Chang, Beijing (CN); Xiao Xiao, Shenzhen (CN); Xiangyu Li, Shanghai (CN); Jun Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 364 days.

(21) Appl. No.: 17/656,980

(22) Filed: Mar. 29, 2022

(65) Prior Publication Data
US 2022/0225382 A1    Jul. 14, 2022

Related U.S. Application Data

(63) Continuation of application No. PCT/CN2019/109778, filed on Sep. 30, 2019.

(51) Int. Cl.
| | |
|---|---|
| *H04W 72/21* | (2023.01) |
| *H04W 72/0453* | (2023.01) |
| *H04W 72/23* | (2023.01) |
| *H04W 72/566* | (2023.01) |
| *H04W 80/02* | (2009.01) |

(52) U.S. Cl.
CPC ....... *H04W 72/21* (2023.01); *H04W 72/0453* (2013.01); *H04W 72/23* (2023.01); *H04W 72/569* (2023.01); *H04W 80/02* (2013.01)

(58) Field of Classification Search
CPC . H04W 72/21; H04W 72/0453; H04W 72/23; H04W 72/569; H04W 80/02; H04W 28/0278
See application file for complete search history.

(56) References Cited

U.S. PATENT DOCUMENTS

| | | |
|---|---|---|
| 2018/0317123 A1 | 11/2018 | Chen et al. |
| 2022/0124778 A1 | 4/2022 | Lu et al. |

FOREIGN PATENT DOCUMENTS

| | | |
|---|---|---|
| CN | 103874049 A | 6/2014 |
| CN | 109076578 A | 12/2018 |
| CN | 113728711 A | 11/2021 |

(Continued)

OTHER PUBLICATIONS

Apple, Discussion on prioritization between SL BSR and UL BSR, 3GPP TSG-RAN WG2 Meeting #107, R2-1910202 Prague, Czech Republic, Aug. 26-30, 2019 (Year: 2019).*

(Continued)

*Primary Examiner* — Chi H Pham
*Assistant Examiner* — Samuel Dilan Rutnam
(74) *Attorney, Agent, or Firm* — Slater Matsil, LLP

(57) ABSTRACT

This application provides a method for reporting a buffer status report and a communications apparatus. The method includes: obtaining, by a terminal device, a size of a first uplink resource; determining, by the terminal device based on the size of the first uplink resource, that a priority of an uplink buffer status report (UL BSR) is higher than a priority of an SL BSR, or that a priority of a sidelink buffer status report (SL BSR) is higher than a priority of a UL BSR.

20 Claims, 10 Drawing Sheets

(56) References Cited

FOREIGN PATENT DOCUMENTS

| EP | 3122139 A1 | 1/2017 |
|---|---|---|
| EP | 3128796 A1 | 2/2017 |
| EP | 3512276 A1 | 7/2019 |
| JP | 2022543342 A | 10/2022 |
| KR | 20190058579 A | 5/2019 |
| KR | 20220030951 A1 | 3/2022 |
| WO | 2019022477 A1 | 1/2019 |
| WO | 2019022480 A1 | 1/2019 |
| WO | 2019160489 A1 | 8/2019 |
| WO | 2021000306 A1 | 1/2021 |
| WO | 2021003645 A1 | 1/2021 |

OTHER PUBLICATIONS

"3rd Generation Partnership Project; Technical Specification Group Radio Access Network; NR; Physical layer procedures for data (Release 15)", 3GPP TS 38.214 V15.7.0, Technical Specification, Sep. 2019, 106 Pages.

"3rd Generation Partnership Project; Technical Specification Group Radio Access Network; NR; Medium Access Control (MAC) protocol specification (Release 15)", 3GPP TS 38.321 V15.7.0, Technical Specification, Sep. 2019, 78 Pages.

Huawei, et al., "Discussion on SL BSR for Mode 1", 3GPP TSG-RAN WG2 # 105bis, R2-1904089, Apr. 8-12, 2019, 3 Pages, Xi'an, China.

Huawei (Rapporteur), "Email discussion summary of [106#80][NR/V2X]—BSR and SR", 3GPP TSG-RAN WG2 #107, R2-1909303, Aug. 26-30, 2019, 37 Pages, Prague, Czechia.

Huawei, et al., "Discussion on SL BSR procedure for NR SL Mode-1", 3GPP TSG-RAN WG2 Meeting #106, R2-1907449, May 13-17, 2019, 8 Pages, Reno, USA.

Huawei, et al., "Further discussion on SR configuration and procedure for NR SL Mode-1", 3GPP TSG-RAN WG2 # 106, R2-1907450, May 13-17, 2019, 9 Pages, Reno, USA.

Oppo, "Left issues for SR and BSR", 3GPP TSG-RAN WG2 Meeting #107, R2-1910037, Aug. 26-Aug. 30, 2019, 6 Pages, Prague, Czech.

Xiaomi, "Discussion on BSR prioritization", 3GPP TSG-RAN WG2 Meeting #107, R2-1911491, Aug. 26-30, 2019, 3 Pages, Prague, CZ.

Apple, "Discussion on prioritization between SL BSR and UL BSR", 3GPP TSG-RAN WG2 Meeting #107, R2-1910202, Aug. 26-30, 2019, 3 Pages, Prague, Czech Republic.

Huawei, et al., "Discussion on remaining issues of SR and BSR for Mode 1", 3GPP TSG-RAN WG2 # 107bis, R2-1913707, Oct. 14-Oct. 18, 2019, 6 Pages, ChongQing, China.

Rapporteur (Ericsson)", [87#31][LTE/ProSe] How the Group Index is included in the BSR", 3GPP TSG-RAN WG2 #87bis, Tdoc R2-144476, Oct. 6-10, 2014, 14 Pages, Shanghai, P.R. China.

* cited by examiner

METHOD FOR REPORTING BUFFER STATUS REPORT AND COMMUNICATIONS APPARATUS

CROSS-REFERENCE TO RELATED APPLICATIONS

This application is a continuation of International Application No. PCT/CN2019/109778, filed on Sep. 30, 2019, the disclosures of which is incorporated herein by reference in its entirety.

TECHNICAL FIELD

This application relates to the field of communications technologies, and in particular, to a method for reporting a buffer status report and a communications apparatus.

BACKGROUND

In the internet of vehicles, that is, a network in which vehicles are connected to each other, moving vehicles are used as information sensed objects, to implement network connections between vehicles and everything (that is, between vehicles and vehicles, people, roads, or service platforms) depending on new-generation information and communications technologies. This can improve an overall intelligent driving capability of a vehicle, provide users with safe, comfortable, intelligent, and efficient driving experience and traffic services, improve traffic operational efficiency, and increase an intelligent level of social traffic services. In a new internet of vehicles solution, vehicle to everything (V2X) communication means that information about a vehicle is provided through a sensor, an in-vehicle terminal, and the like that are mounted on the vehicle, and vehicle to vehicle (V2V) communication, vehicle to pedestrian (V2P) communication, vehicle to infrastructure (V2I) communication, and vehicle to network (V2N) communicate are implemented by using various communications technologies. For example, these communication scenarios are shown in FIG. 1.

There are two air communications interfaces in V2X: a PC5 interface and a Uu interface. The PC5 interface is mainly used for direct communication between terminals, and the Uu interface is mainly used for communication between a terminal and a network. On the Uu interface, a terminal may send uplink data to a base station over an uplink (UL) shown in FIG. 2. Before the terminal sends the uplink data, the terminal sends a UL buffer status report (BSR) to the base station over the UL, where the UL BSR is used to indicate an amount of to-be-sent data that exists in an uplink buffer of the terminal, so that the base station allocates, to the terminal based on the UL BSR, an uplink resource (UL grant) for transmitting the uplink data (UL data). On the PC5 interface, terminals may directly communicate with each other over a sidelink (SL) shown in FIG. 2. In a possible implementation, before the terminals directly communicate with each other over the SL, one of the terminals sends an SL BSR to a base station over a UL shown in FIG. 2, where the SL BSR is used to indicate an amount of to-be-sent data that exists in a sidelink buffer of the terminal, so that the base station allocates, to the terminal based on the SL BSR, a sidelink resource (SL grant) for transmitting sidelink data (SL data).

Currently, in a scenario in which a terminal simultaneously triggers a UL BSR and an SL BSR, there is no effective solution for improving efficiency of sending uplink data and sidelink data.

SUMMARY

Embodiments of this application provide a method for reporting a buffer status report and an apparatus, to improve efficiency of transmitting uplink data and/or sidelink data.

To achieve the foregoing objective, the following technical solutions are used in the embodiments of this application.

According to a first aspect, an embodiment of this application provides a method for reporting a buffer status report. The method is applied to a terminal device, a component (for example, a chip system) of a terminal device, or another component having a terminal function. The method includes: The terminal device obtains a first parameter corresponding to a sidelink buffer status report SL BSR and a second parameter corresponding to an uplink buffer status report UL BSR, and determines, based on the first parameter and the second parameter, that a priority of the SL BSR is higher than a priority of the UL BSR, or that a priority of the UL BSR is higher than a priority of the SL BSR. The first parameter is related to a priority of a sidelink service having data, and the second parameter is related to a priority of an uplink service having data. Alternatively, the first parameter is determined based on a priority corresponding to a sidelink service having data, and the second parameter is determined based on a priority of an uplink service having data. In a possible implementation, a priority (for example, a priority of a sidelink service with a highest priority in priorities) in one or more priorities respectively corresponding to one or more sidelink services having data may be used as the first parameter, and a priority (for example, a highest priority) in one or more priorities respectively corresponding to one or more uplink services having data may be used as the second parameter.

In the existing solution, a terminal device may continuously preferentially encapsulate an SL BSR media access control control element (MAC CE) or a UL BSR MAC CE, and then transmission of uplink data or sidelink data is delayed because a priority of a UL BSR and a priority of an SL BSR are determined by comparing a priority of an LCH with a highest priority in priorities corresponding to LCHs for triggering the UL BSR with a priority of an LCH with a highest priority in priorities corresponding to LCHs for triggering the SL BSR. Compared with the existing solution, in the technical solutions in the embodiments of this application, the priority of the UL BSR and the priority of the SL BSR are determined based on a priority of a sidelink service actually having sidelink data and/or a priority of an uplink service actually having uplink data, and an obtained priority comparison result satisfies a service requirement better. In this way, the terminal device can preferentially send high-priority uplink data or high-priority sidelink data subsequently. This improves efficiency of sending uplink data or sidelink data.

In a possible solution, the first parameter is a priority of a sidelink service with a highest priority in one or more priorities corresponding to one or more sidelink services having sidelink data; and/or the second parameter is a priority of an uplink service with a highest priority in one or more priorities corresponding to one or more uplink services having uplink data.

In a possible solution, the sidelink service includes one or more of the following: a sidelink quality of service QoS flow, a sidelink logical channel LCH, a sidelink data radio bearer DRB, a sidelink logical channel group LCG, a sidelink service destination identifier, and a sidelink packet data unit session PDU session.

The uplink service includes one or more of the following: an uplink quality of service flow, an uplink logical channel LCH, an uplink data radio bearer DRB, an uplink logical channel group LCG, an uplink service destination identifier, and an uplink packet data unit session.

In a possible solution, the sidelink service is the SL LCG, the first parameter is a priority of an SL LCG with a highest priority in one or more priorities corresponding to one or more SL LCGs having sidelink data; and/or if the uplink service is the UL LCG, the second parameter is a priority of a UL LCG with a highest priority in one or more priorities corresponding to one or more UL LCGs having uplink data.

In a possible solution, if the sidelink service is the SL LCH, the first parameter is a priority of an SL LCH with a highest priority in one or more priorities corresponding to one or more SL LCHs having sidelink data; and/or if the uplink service is the UL LCH, the second parameter is a priority of a UL LCH with a highest priority in one or more priorities corresponding to one or more UL LCHs having uplink data.

In a possible solution, that the terminal device determines, based on the first parameter and the second parameter, that a priority of the SL BSR is higher than a priority of the UL BSR, or that a priority of the UL BSR is higher than a priority of the SL BSR includes:

If the first parameter is greater than the second parameter, the terminal device determines that the priority of the SL BSR is higher than the priority of the UL BSR; or if the first parameter is less than the second parameter, the terminal device determines that the priority of the UL BSR is higher than the priority of the SL BSR.

In a possible solution, the method further includes:

If there is a service that satisfies a first condition, the terminal device generates a first BSR, where the first BSR includes buffer status information of the service that satisfies the first condition.

The terminal device sends the first BSR.

The first condition is that a priority of the service is greater than or equal to a first threshold.

In a possible solution, the terminal device sends the first BSR on a first uplink resource.

In a possible solution, the first BSR does not include buffer status information of a service that does not satisfy the first condition. In other words, the first BSR includes only the buffer status information of the service that satisfies the first condition. In other words, the first BSR includes only buffer status information of a service whose priority is greater than or equal to the first threshold.

In a possible solution, the first threshold includes any one of the following: a preconfigured value, a value configured by a network, a priority of a service with a highest priority in priorities corresponding to services for triggering a lower-priority BSR, or a priority of a service with a highest priority in one or more priorities corresponding to one or more services that have data and that correspond to a lower-priority BSR. In a possible implementation, the first threshold may alternatively be a value determined by the terminal device based on some parameters. For example, the terminal device determines the first threshold based on a size of the first uplink resource.

If the priority of the UL BSR is higher than the priority of the SL BSR, the lower-priority BSR is the SL BSR; or if the priority of the UL BSR is lower than the priority of the SL BSR, the lower-priority BSR is the UL BSR.

The service that satisfies the first condition may include both a sidelink service and an uplink service. The uplink service is an uplink logical channel, and the sidelink service is a sidelink logical channel. FIG. 11 is used as an example, and a technical solution corresponding to FIG. 6(a) is used to compare priorities of services. If the first threshold is 4, LCHs having data are SL LCHs that are filled in black and whose priority values are 2, 7, 8, 4, 6, and 10, and UL LCHs whose priority values are 3, 4, 5, and 6. A priority of the first SL LCH in an SL LCG 1 corresponding to a DST 1 and a priority of the third UL LCH in a UL LCG 1 are greater than or equal to the first threshold. In other words, LCHs that satisfy the first condition are LCHs indicated by arrows in FIG. 11.

The service that satisfies the first condition may include both a sidelink service and an uplink service. The uplink service is an uplink logical channel group, and the sidelink service is a sidelink logical channel group. FIG. 11 is used as an example, and a technical solution corresponding to FIG. 6(a) is used to compare priorities of services. If the first threshold is 4, there are six LCGs having data in FIG. 11. A priority value of an LCG 1 corresponding to a DST 1 is 1. Likewise, a priority value of an LCG 2 corresponding to the DST 1 is 7, a priority value of an LCG 1 corresponding to a DST 2 is 4, and a priority value of an LCG 2 corresponding to the DST 2 is 9. A priority value of an LCG 1 corresponding to a DST 3 is 1, and a priority value of an LCG 1 corresponding to a DST 4 is 4. In other words, LCGs whose priorities are greater than or equal to the first threshold are four LCGs indicated by the dashed-line boxes.

In a possible implementation, the service that satisfies the first condition is a sidelink service or an uplink service. In this case, the first threshold may be related to a priority of a UL BSR and a priority of an SL BSR. Specifically, when the priority of the UL BSR is higher than the priority of the SL BSR, the service that satisfies the first condition is an uplink service whose service priority is greater than or equal to the first threshold. When the priority of the UL BSR is lower than the priority of the SL BSR, the service that satisfies the first condition is a sidelink service whose service priority is greater than or equal to the first threshold. Herein, the technical solutions corresponding to FIG. 6(a), FIG. 6(b), or FIG. 6(c) or an existing technology may be used to compare the priority of the UL BSR with the priority of the SL BSR.

In this case, after the terminal device determines the priority of the UL BSR and the priority of the SL BSR, the terminal device may truncate a higher-priority BSR. To be specific, the terminal device limits an amount of LCG buffer status information included in the higher-priority BSR. In this case, the first threshold may be the priority of the service with the highest priority in the priorities corresponding to the services for triggering the lower-priority BSR, or the priority of the service with the highest priority in the one or more priorities corresponding to the one or more services that have data and that correspond to the lower-priority BSR. Certainly, the first threshold may alternatively be a preconfigured value, a value configured by a network device, or a value determined by the terminal device.

In a possible solution, the method further includes:

The terminal device sends a second BSR, where the second BSR includes the buffer status information of the service that does not satisfy the first condition. In other words, the second BSR includes buffer status information of a service whose priority is less than or equal to the first threshold. On a basis that the terminal device sends the first BSR on the first uplink resource, if there is a remaining resource in the first uplink resource, the terminal device may send the second BSR on the first uplink resource. Alternatively, if there is no remaining resource in the first uplink resource, the terminal device may send the second BSR on a second uplink resource.

According to a second aspect, this application provides a method for reporting a buffer status report. The method may be performed by a terminal device, a component (for example, a chip system) of a terminal device, or another component that has a terminal function. The method includes: The terminal device obtains a size of a first uplink resource, and determines, based on the size of the first uplink resource, that a priority of a UL BSR is higher than a priority of an SL BSR, or that a priority of an SL BSR is higher than a priority of a UL BSR.

In a possible solution, that the terminal device determines, based on the size of the first uplink resource, that a priority of a UL BSR is higher than a priority of an SL BSR includes: If the size of the first uplink resource is greater than or equal to a size of the UL BSR, or the size of the first uplink resource is greater than or equal to a sum of a size of the UL BSR and a size of an SL BSR including buffer status information of at least one SL LCG, or the size of the first uplink resource is greater than or equal to a size of the UL BSR and the size of the first uplink resource is less than or equal to a size of the SL BSR, or the size of the first uplink resource is greater than or equal to a sum of a size of the UL BSR and a size of an SL BSR including buffer status information of at least one SL LCG, and the size of the first uplink resource is less than or equal to the size of the SL BSR, the terminal device determines that the priority of the UL BSR is higher than the priority of the SL BSR.

In a possible solution, that the terminal device determines, based on the size of the first uplink resource, that a priority of an SL BSR is higher than a priority of a UL BSR includes: If the size of the first uplink resource is greater than or equal to a size of the SL BSR, or the size of the first uplink resource is greater than or equal to a sum of a size of the SL BSR and a size of a UL BSR including buffer status information of at least one UL LCG, or the size of the first uplink resource is greater than or equal to a size of the SL BSR and the size of the first uplink resource is less than or equal to a size of the UL BSR, or the size of the first uplink resource is greater than or equal to a sum of a size of the SL BSR and a size of a UL BSR including buffer status information of at least one UL LCG, and the size of the first uplink resource is less than or equal to the size of the UL BSR, the terminal device determines that the priority of the SL BSR is higher than the priority of the UL BSR.

In a possible solution, the method further includes: The terminal device obtains a first parameter corresponding to the SL BSR and a second parameter corresponding to the UL BSR.

The first parameter is a priority of a sidelink service with a highest priority in one or more priorities corresponding to one or more sidelink services having sidelink data; and/or the second parameter is a priority of an uplink service with a highest priority in one or more priorities corresponding to one or more uplink services having uplink data.

Alternatively, the first parameter is a priority of a sidelink service with a highest priority in priorities corresponding to sidelink services for triggering the SL BSR; and/or the second parameter is a priority of an uplink service with a highest priority in priorities corresponding to uplink services for triggering the UL BSR.

That the terminal device determines, based on the size of the first uplink resource, that a priority of a UL BSR is higher than a priority of an SL BSR, or that a priority of an SL BSR is higher than a priority of a UL BSR includes: The terminal device determines, based on the size of the first uplink resource, the first parameter, and the second parameter, that the priority of the UL BSR is higher than the priority of the SL BSR, or that the priority of the SL BSR is higher than the priority of the UL BSR.

In a possible solution, that the terminal device determines, based on the size of the first uplink resource, the first parameter, and the second parameter, that the priority of the UL BSR is higher than the priority of the SL BSR, or that the priority of the SL BSR is higher than the priority of the UL BSR includes: If the size of the first uplink resource is less than a size of the SL BSR and less than a size of the UL BSR, the terminal device determines, based on the first parameter and the second parameter, that the priority of the UL BSR is higher than the priority of the SL BSR, or that the priority of the SL BSR is higher than the priority of the UL BSR; or if the size of the first uplink resource is greater than or equal to a size of the SL BSR and greater than or equal to a size of the UL BSR, the terminal device determines, based on the first parameter and the second parameter, that the priority of the UL BSR is higher than the priority of the SL BSR, or that the priority of the SL BSR is higher than the priority of the UL BSR.

In a possible solution, that the terminal device determines, based on the first parameter and the second parameter, that the priority of the UL BSR is higher than the priority of the SL BSR, or that the priority of the SL BSR is higher than the priority of the UL BSR includes: If the first parameter corresponding to the SL BSR is greater than the second parameter corresponding to the UL BSR, the terminal device determines that the priority of the SL BSR is higher than the priority of the UL BSR; or if the first parameter corresponding to the SL BSR is less than the second parameter corresponding to the UL BSR, the terminal device determines that the priority of the UL BSR is higher than the priority of the SL BSR.

According to a third aspect, an embodiment of this application provides a method for reporting a buffer status report. The method is applied to a terminal device, a component (for example, a chip system) of a terminal device, or another component having a terminal function. The method includes: The terminal device generates a first BSR and sends the first BSR. The first BSR includes buffer status information of a service that satisfies a first condition. The first condition is that a priority of the service is greater than or equal to a first threshold.

In a possible solution, the first BSR does not include buffer status information of a service that does not satisfy the first condition.

In a possible solution, the first threshold includes any one of the following: a preconfigured value, a value configured by a network device, a priority of a service with a highest priority in priorities corresponding to services for triggering a lower-priority BSR, or a priority of a service with a highest priority in one or more priorities corresponding to one or more services that have data and that correspond to a lower-priority BSR. In this case, if a priority of a UL BSR is higher than a priority of an SL BSR, the lower-priority BSR is the SL BSR; or if a priority of a UL BSR is lower than a priority of an SL BSR, the lower-priority BSR is the UL BSR.

In a possible solution, the method further includes: The terminal device sends a second BSR, where the second BSR includes the buffer status information of the service that does not satisfy the first condition.

According to a fourth aspect, an embodiment of this application provides a communications apparatus. The apparatus may be a terminal device, a component (for example, a chip system) of a terminal device, or another component having a terminal function. The apparatus includes a processing module and a transceiver module. The processing module is configured to: obtain a first parameter corresponding to a sidelink buffer status report SL BSR and a second parameter corresponding to an uplink buffer status report UL BSR, and determine, based on the first parameter and the second parameter, that a priority of the SL BSR is higher than a priority of the UL BSR, or that a priority of the UL BSR is higher than a priority of the SL BSR. The first parameter is related to a priority of a sidelink service having data, and the second parameter is related to a priority of an uplink service having data.

In a possible solution, the first parameter is a priority of a sidelink service with a highest priority in one or more priorities corresponding to one or more sidelink services having sidelink data; and/or the second parameter is a priority of an uplink service with a highest priority in one or more priorities corresponding to one or more uplink services having uplink data.

In a possible solution, the sidelink service includes one or more of the following: a sidelink quality of service QoS flow, a sidelink logical channel LCH, a sidelink data radio bearer DRB, a sidelink logical channel group LCG, a sidelink service destination identifier, and a sidelink packet data unit session PDU session.

The uplink service includes one or more of the following: an uplink quality of service flow, an uplink logical channel LCH, an uplink data radio bearer DRB, an uplink logical channel group LCG, an uplink service destination identifier, and an uplink packet data unit session.

In a possible solution, the sidelink service is the SL LCG, the first parameter is a priority of an SL LCG with a highest priority in one or more priorities corresponding to one or more SL LCGs having sidelink data; and/or if the uplink service is the UL LCG, the second parameter is a priority of a UL LCG with a highest priority in one or more priorities corresponding to one or more UL LCGs having uplink data.

In a possible solution, if the sidelink service is the SL LCH, the first parameter is a priority of an SL LCH with a highest priority in one or more priorities corresponding to one or more SL LCHs having sidelink data; and/or if the uplink service is the UL LCH, the second parameter is a priority of a UL LCH with a highest priority in one or more priorities corresponding to one or more UL LCHs having uplink data.

In a possible solution, that the processing module is configured to determine, based on the first parameter and the second parameter, that a priority of the SL BSR is higher than a priority of the UL BSR, or that a priority of the UL BSR is higher than a priority of the SL BSR includes: If the first parameter is greater than the second parameter, the processing module is configured to determine that the priority of the SL BSR is higher than the priority of the UL BSR; or if the first parameter is less than the second parameter, the processing module is configured to determine that the priority of the UL BSR is higher than the priority of the SL BSR.

In a possible solution, the processing module is further configured to generate a first BSR when there is a service that satisfies a first condition, where the first BSR includes buffer status information of the service that satisfies the first condition.

The transceiver module is configured to send the first BSR.

The first condition is that a priority of the service is greater than or equal to a first threshold.

In a possible solution, the first BSR does not include buffer status information of a service that does not satisfy the first condition.

In a possible solution, the first threshold includes any one of the following: a preconfigured value, a value configured by a network, a priority of a service with a highest priority in priorities corresponding to services for triggering a lower-priority BSR, or a priority of a service with a highest priority in one or more priorities corresponding to one or more services that have data and that correspond to a lower-priority BSR.

If the priority of the UL BSR is higher than the priority of the SL BSR, the lower-priority BSR is the SL BSR; or if the priority of the UL BSR is lower than the priority of the SL BSR, the lower-priority BSR is the UL BSR.

In a possible solution, the transceiver module is further configured to send a second BSR, where the second BSR includes the buffer status information of the service that does not satisfy the first condition.

Optionally, the communications apparatus in the fourth aspect may further include a storage module. The storage module stores a program or an instruction. When the processing module executes the program or the instruction, the communications apparatus in the fourth aspect is enabled to perform the functions of the terminal device in the first aspect.

According to a fifth aspect, an embodiment of this application provides a communications apparatus. The apparatus may be a terminal device, a component (for example, a chip system) of a terminal device, or another component having a terminal function. The apparatus includes a processing module and a transceiver module.

The processing module is configured to: obtain a size of a first uplink resource, and determine, based on the size of the first uplink resource, that a priority of a UL BSR is higher than a priority of an SL BSR, or that a priority of an SL BSR is higher than a priority of a UL BSR.

In a possible solution, that the processing module is configured to determine, based on the size of the first uplink resource, that a priority of a UL BSR is higher than a priority of an SL BSR includes: If the size of the first uplink resource is greater than or equal to a size of the UL BSR, or the size of the first uplink resource is greater than or equal to a sum of a size of the UL BSR and a size of an SL BSR including buffer status information of at least one SL LCG, or the size of the first uplink resource is greater than or equal to a size of the UL BSR and the size of the first uplink resource is less than or equal to a size of the SL BSR, or the size of the first uplink resource is greater than or equal to a sum of a size of the UL BSR and a size of an SL BSR including buffer status information of at least one SL LCG, and the size of the first uplink resource is less than or equal to the size of the SL BSR, the processing module is configured to determine that the priority of the UL BSR is higher than the priority of the SL BSR.

In a possible solution, that the processing module is configured to determine, based on the size of the first uplink resource, that a priority of an SL BSR is higher than a priority of a UL BSR includes: If the size of the first uplink resource is greater than or equal to a size of the SL BSR, or the size of the first uplink resource is greater than or equal to a sum of a size of the SL BSR and a size of a UL BSR including buffer status information of at least one UL LCG, or the size of the first uplink resource is greater than or equal to a size of the SL BSR and the size of the first uplink resource is less than or equal to a size of the UL BSR, or the size of the first uplink resource is greater than or equal to a sum of a size of the SL BSR and a size of a UL BSR including buffer status information of at least one UL LCG, and the size of the first uplink resource is less than or equal to the size of the UL BSR, the processing module is configured to determine that the priority of the SL BSR is higher than the priority of the UL BSR.

In a possible solution, the processing module is further configured to obtain a first parameter corresponding to the SL BSR and a second parameter corresponding to a UL BSR.

The first parameter is a priority of a sidelink service with a highest priority in one or more priorities corresponding to one or more sidelink services having sidelink data; and/or the second parameter is a priority of an uplink service with a highest priority in one or more priorities corresponding to one or more uplink services having uplink data.

Alternatively, the first parameter is a priority of a sidelink service with a highest priority in priorities corresponding to sidelink services for triggering the SL BSR; and/or the second parameter is a priority of an uplink service with a highest priority in priorities corresponding to uplink services for triggering the UL BSR.

That the processing module is configured to determine, based on the size of the first uplink resource, that a priority of a UL BSR is higher than a priority of an SL BSR, or that a priority of an SL BSR is higher than a priority of a UL BSR includes: The processing module is configured to determine, based on the size of the first uplink resource, the first parameter, and the second parameter, that the priority of the UL BSR is higher than the priority of the SL BSR, or that the priority of the SL BSR is higher than the priority of the UL BSR.

In a possible solution, that the processing module is configured to determine, based on the size of the first uplink resource, the first parameter, and the second parameter, that the priority of the UL BSR is higher than the priority of the SL BSR, or that the priority of the SL BSR is higher than the priority of the UL BSR includes: If the size of the first uplink resource is less than a size of the SL BSR and less than a size of the UL BSR, the processing module is configured to determine, based on the first parameter and the second parameter, that the priority of the UL BSR is higher than the priority of the SL BSR, or that the priority of the SL BSR is higher than the priority of the UL BSR.

Alternatively, if the size of the first uplink resource is greater than or equal to a size of the SL BSR and greater than or equal to a size of the UL BSR, the terminal device determines, based on the first parameter and the second parameter, that the priority of the UL BSR is higher than the priority of the SL BSR, or that the priority of the SL BSR is higher than the priority of the UL BSR.

In a possible solution, that the processing module is configured to determine, based on the first parameter and the second parameter, that the priority of the UL BSR is higher than the priority of the SL BSR, or that the priority of the SL BSR is higher than the priority of the UL BSR includes: If the first parameter corresponding to the SL BSR is greater than the second parameter corresponding to the UL BSR, the processing module is configured to determine that the priority of the SL BSR is higher than the priority of the UL BSR; or if the first parameter corresponding to the SL BSR is less than the second parameter corresponding to the UL BSR, the processing module is configured to determine that the priority of the UL BSR is higher than the priority of the SL BSR.

Optionally, the communications apparatus in the fifth aspect may further include a storage module. The storage module stores a program or an instruction. When the processing module executes the program or the instruction, the communications apparatus in the fifth aspect is enabled to perform the functions of the terminal device in the second aspect.

According to a sixth aspect, an embodiment of this application provides a communications apparatus. The apparatus may be a terminal device, a component (for example, a chip system) of a terminal device, or another component having a terminal function. The apparatus includes a processing module and a transceiver module.

The processing module is configured to generate a first BSR.

The transceiver module is configured to send the first BSR. The first BSR includes buffer status information of a service that satisfies a first condition. The first condition is that a priority of the service is greater than or equal to a first threshold.

In a possible solution, the first BSR does not include buffer status information of a service that does not satisfy the first condition.

In a possible solution, the first threshold includes any one of the following: a preconfigured value, a value configured by a network device, a priority of a service with a highest priority in priorities corresponding to services for triggering a lower-priority BSR, or a priority of a service with a highest priority in one or more priorities corresponding to one or more services that have data and that correspond to a lower-priority BSR. In this case, if a priority of a UL BSR is higher than a priority of an SL BSR, the lower-priority BSR is the SL BSR; or if a priority of a UL BSR is lower than a priority of an SL BSR, the lower-priority BSR is the UL BSR.

In a possible solution, the transceiver module is further configured to send a second BSR, where the second BSR includes the buffer status information of the service that does not satisfy the first condition.

Optionally, the communications apparatus in the sixth aspect may further include a storage module. The storage module stores a program or an instruction. When the processing module executes the program or the instruction, the communications apparatus in the sixth aspect is enabled to perform the functions of the terminal device in the third aspect.

According to a seventh aspect, this application provides a communications apparatus. The communications apparatus has a function of implementing the method for reporting a buffer status report according to any one of the first aspect, the second aspect, or the third aspect. The functions may be implemented by hardware, or may be implemented by hardware executing corresponding software. The hardware or the software includes one or more modules corresponding to the functions.

According to an eighth aspect, a communications apparatus is provided, including a processor and a memory. The memory is configured to store a computer-executable instruction. When the communications apparatus runs, the processor executes the computer-executable instruction stored in the memory, to enable the communications apparatus to perform the method for reporting a buffer status report according to any one of the first aspect, the second aspect, or the third aspect.

According to a ninth aspect, a communications apparatus is provided, including a processor. The processor is configured to: being coupled to a memory, read an instruction from the memory, and then perform, according to the instruction, the method for reporting a buffer status report according to any one of the first aspect, the second aspect, or the third aspect.

According to a tenth aspect, a computer-readable storage medium is provided. The computer-readable storage medium stores an instruction. When the instruction is run on a computer, the computer is enabled to perform the method for reporting a buffer status report according to any one of the first aspect, the second aspect, or the third aspect.

According to an eleventh aspect, a computer program product including an instruction is provided. When the computer program product runs on a computer, the computer is enabled to perform the method for reporting a buffer status report according to any one of the first aspect, the second aspect, or the third aspect.

According to a twelfth aspect, a circuit system is provided. The circuit system includes a processing circuit. The processing circuit is configured to perform the method for reporting a buffer status report according to any one of the first aspect, the second aspect, or the third aspect.

According to a thirteenth aspect, a chip is provided. The chip includes a processor. The processor is coupled to a memory. The memory stores a program instruction. The processor executes the program instruction stored in the memory, to implement the method for reporting a buffer status report according to any one of the first aspect, the second aspect, or the third aspect.

According to a fourteenth aspect, a chip system is provided. The chip system includes a processor and an input/output port. The processor is configured to implement a processing function of the method for reporting a buffer status report according to any one of the first aspect to the third aspect. The input/output port is configured to implement a transceiving function of the method for reporting a buffer status report according to any one of the first aspect to the third aspect.

In a possible solution, the chip system further includes a memory. The memory is configured to store a program instruction and data for implementing a function of the method for reporting a buffer status report according to any one of the first aspect to the third aspect.

The chip system may include a chip, or may include a chip and another discrete component.

For technical effects brought by any design manner in the second aspect to the fourteenth aspect, refer to technical effects brought by different design manners in the first aspect. Details are not described herein again.

DETAILED DESCRIPTION OF ILLUSTRATIVE EMBODIMENTS

Figure 1:
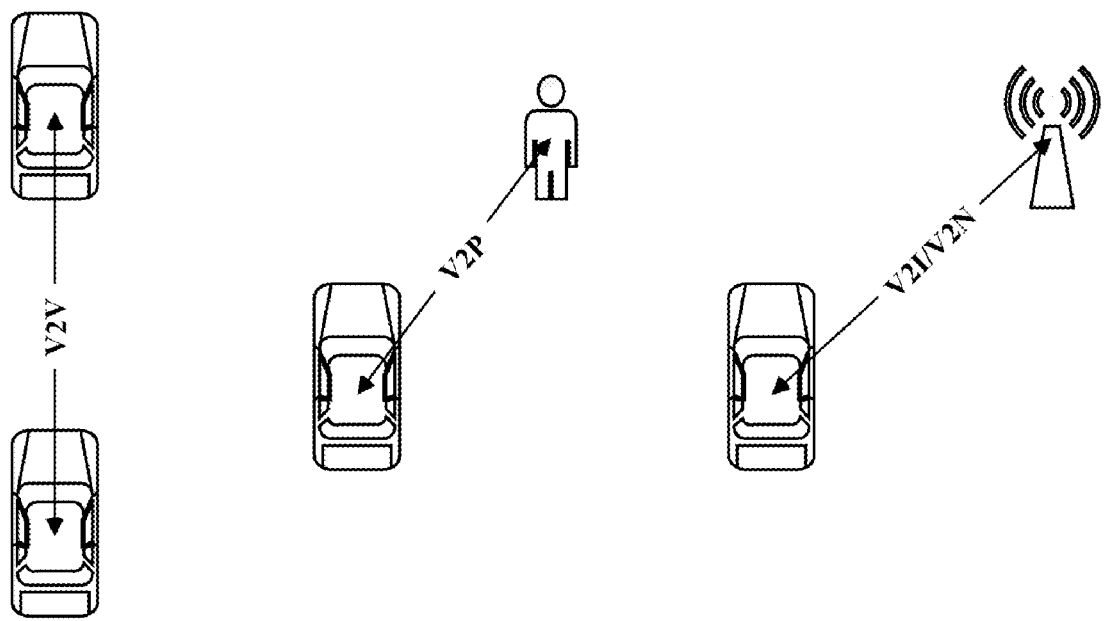
FIG. 1 is a schematic diagram of a V2X communication scenario according to an embodiment of this application.
Figure 2:
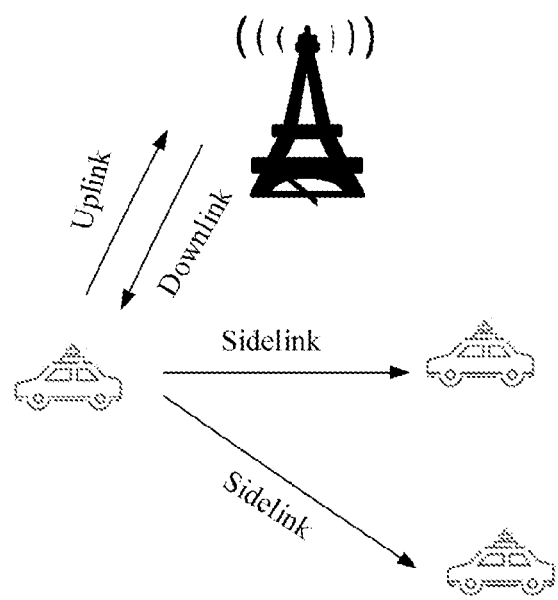
FIG. 2 is a schematic diagram of an uplink and a sidelink according to an embodiment of this application.

The following describes the technical solutions of this application with reference to the accompanying drawings.

First, to help readers understand the technical solutions in the embodiments of this application, some technical terms related to the embodiments of this application are first described.

1. Logical channel (LCH): A terminal may establish a plurality of logical channels based on different services. An LCH is used to indicate a channel carrying data. LCHs can be classified into a control channel and a traffic channel based on types of the LCHs.

2. Logical channel group (LCG): If there is data to be sent on a logical channel, a BSR of the logical channel is reported. This increases signaling overheads. To avoid this case, a concept of an LCG is introduced in LTE. One LCG includes one or more logical channels. UE reports a BSR based on an LCG. To be specific, the UE indicates, in a BSR, a buffer size in each LCG.

3. BSR MAC control element (CE): A BSR is carried in a UL MAC protocol data unit (PDU), and the UL MAC PDU includes one or more BSR MAC CEs. Specifically, on a PC5 interface, a UL MAC PDU includes one or more SL BSR MAC CEs; and on a Uu interface, a UL MAC PDU includes one or more UL BSR MAC CEs.

For example, a format of a BSR MAC CE is shown in Table 1.

TABLE 1

| Destination index 1 | LCG ID 1 | oct 1 |
|---|---|---|
| Buffer Size 1 | | oct 2 |
| Destination index 2 | LCG ID 2 | oct 3 |
| Buffer Size 2 | | oct 4 |
| ... | | ... |

Each destination (DST) index may include one or more LCG IDs, and a plurality of destination indexes may include a same LCG ID. For example, the destination index 1 may include an LCG ID 1 and an LCG ID 2, and the destination index 2 may also include the LCG ID 1 and the LCG ID 2. A destination index and an LCG ID may be jointly used to uniquely indicate an LCG.

In the embodiments of this application, a terminal device may encapsulate the BSR MAC CE shown in Table 1 in a UL MAC PDU, and send the UL MAC PDU to a network device, to report a buffer size (namely, the buffer size 1) in an LCG 1 and a buffer size (namely, the buffer size 2) of an LCG 2 to the network device.

A format of the UL BSR MAC CE on the Uu interface may be different from a format of the SL BSR MAC CE on the PC5 interface. Specifically, the UL BSR MAC CE on the Uu interface has four formats:

a short BSR format (with a fixed size), that is, a short BSR format, a long BSR format (with a variable size), that is, a long BSR format, a short truncated BSR format (with a fixed size), that is, a short truncated BSR format, and a long truncated BSR format (with a variable size), that is, a long truncated BSR format.

The SL BSR MAC CE on the PC5 interface has two formats:

a BSR format (with a variable size), and a truncated BSR format (with a variable size).

4. Logical channel identity (LCID): A BSR format, or referred to as a BSR MAC CE format, is identified by an LCID in a subheader included in a UL MAC PDU. In a possible implementation, an LCID value and meanings of different LCID values are shown in Table 2.

TABLE 2

| LCID value | Meaning |
| --- | --- |
| 000000 | CCCH of size other than 48 bits |
| 000001 to 100000 | Identity of the logical channel |
| 100001 | CCCH of size 48 bits |
| 100010 to 110100 | Reserved |
| 110101 | Recommended bit rate query |
| 110110 | Multiple Entry PHR (four octets Ci) |
| 110111 | Configured Grant Confirmation |
| 111000 | Multiple Entry PHR (one octet Ci) |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

It can be learned that according to Table 2, when LCID values are 111011, 111100, 111101, and 111110, BSR formats are a short truncated BSR format, a long truncated BSR format, a short BSR format, and a long BSR format.

Each BSR MAC CE corresponds to one LCID, and the LCID is used to indicate a BSR format of the BSR MAC CE. For example, the BSR MAC CE shown in Table 1 corresponds to an LCID value 111011, and the LCID value indicates that the BSR MAC CE is in a short truncated BSR format.

5. Pending: Pending means being triggered and to be sent. For example, pending data is data that is to be sent. A pending BSR is a BSR that is triggered and to be sent. A pending SR is an SR that is triggered and to be sent.

6. Non-padding buffer status report (non-padding BSR): Based on different trigger conditions, BSRs are classified into a padding buffer status report (padding BSR) and a non-padding buffer status report (non-padding BSR). For example, after a terminal device multiplexes all possible data and signaling in a multiplexing sequence, if there is still a remaining uplink resource and a size of the remaining resource is sufficient to accommodate a BSR and a subheader of the BSR, the BSR is triggered, and the BSR is referred to as the padding BSR. When the terminal device generates data whose priority is higher than a priority of current to-be-transmitted data, a BSR is triggered, and the BSR is referred to as the non-padding BSR. A priority of the foregoing data may be understood as a priority of an LCH for buffering the data.

7. Priority sequence: Generally, an SL BSR MAC CE and a UL BSR MAC CE have a priority sequence in a process of multiplexing and encapsulating the SL BSR MAC CE or the UL BSR MAC CE to form a MAC PDU. If a priority of the SL BSR MAC CE is higher than a priority of the UL BSR MAC CE, a terminal device preferentially encapsulates the SL BSR MAC CE in the MAC PDU; otherwise, if the priority of the SL BSR MAC CE is lower than the priority of the UL BSR MAC CE, the terminal device preferentially encapsulates the UL BSR MAC CE in the MAC PDU.

8. Quality of service flow (QoS flow): A type of data flows can be assigned transmission priorities to identify relative importance of the data flows. In addition, mechanisms such as various priority forwarding policies and congestion avoidance mechanisms provided by a device are used to provide special transmission services for the data flows. Such a type of data flows is referred to as a QoS flow.

9. Data radio bearer (DRB): Radio bearers are classified into a signaling radio bearer (SRB) and a DRB based on different carried content. The DRB is used to carry user plane data. The SRB is used to carry control plane data, that is, signaling.

10. Packet data unit (PDU) session: A terminal device may establish a plurality of PDU sessions (protocol data unit sessions). One PDU session may correspond to a plurality of QoS flows. A plurality of QoS flows corresponding to a same PDU session may be mapped onto a same DRB.

11. Service destination identifier: Service destination identifiers are used to distinguish between different services. For example, a service destination identifier may be the destination index shown in Table 1.

In the embodiments of this application, BSR and BSR MAC CE may sometimes be interchangeably used. Buffer status, buffered status, buffer information, and buffered information are sometimes interchangeably used.

For example, a priority in the embodiments of this application may be equivalently replaced with a prose per-packet priority (PPPP), a priority level value, a priority value, a 5G quality of service identifier (Fifth-generation QoS Identifier (5QI)), or another parameter reflecting an SL transmission quality requirement. For example, the priority in this application may be replaced with PPPP.

The technical solutions in the embodiments of this application may be applied to various communications systems, such as an orthogonal frequency division multiple access (OFDMA) system, a single carrier frequency division multiple access (SC-FDMA) system, and other systems. The terms "system" and "network" are interchangeable. The OFDMA system may implement wireless technologies such as evolved universal terrestrial radio access (E-UTRA) and ultra mobile broadband (UMB). The E-UTRA is an evolved version of a universal mobile telecommunications system (UMTS). A new E-UTRA version is used in LTE and various versions evolved based on LTE in the 3rd generation partnership project (3GPP). A 5G communications system is a next-generation communications system under research, and may also be referred to as an NR system. The 5G communications system includes a 5G non-standalone (NSA) mobile communications system, a 5G standalone (SA) mobile communications system, or both a 5G NSA mobile communications system and a 5G SA mobile communications system. In addition, the communications systems may be further applicable to a future-oriented communications technology, and are all applicable to the technical solutions provided in the embodiments of this application. The foregoing communications systems applicable to this application are merely examples for description, and communications systems applicable to this application are not limited thereto. A general description is provided herein, and details are not described below.

All aspects, embodiments, or features are presented in this application by describing a system that may include a plurality of devices, components, modules, and the like. It should be appreciated and understood that, each system may include other devices, components, modules, and the like, and/or may not include all devices, components, modules, and the like discussed with reference to the accompanying drawings. In addition, a combination of these solutions may be used.

In the specification and accompanying drawings of this application, the terms "first", "second", and the like are intended to distinguish between different objects or distinguish between different processing of a same object, but are not used to describe a particular order of the objects.

"At least one" means one or more.

"A plurality of" means two or more than two.

The term "and/or" describes an association relationship between associated objects and may indicate three relationships. For example, A and/or B may indicate the following cases: Only A exists, both A and B exist, and only B exists, where A and B may be singular or plural.

The character "/" generally indicates an "or" relationship between associated objects. For example, A/B may represent A or B.

In addition, the terms "include", "contain", and any other variants thereof mentioned in descriptions of this application are intended to cover a non-exclusive inclusion. For example, a process, a method, a system, a product, or a device that includes a series of steps or units is not limited to the listed steps or units, but optionally includes other unlisted steps or units, or optionally includes other inherent steps or units of the process, the method, the product, or the device.

It should be noted that in the embodiments of this application, the word "an example", "for example", or the like is used to represent giving an example, an illustration, or a description. Any embodiment or design scheme described as "an example" or "for example" in the embodiments of this application should not be explained as being more preferred or having more advantages than another embodiment or design scheme. Exactly, use of the word "an example", "for example", or the like is intended to present a related concept in a specific manner.

In the specification and the accompanying drawings of this application, "of," "corresponding," and "relevant," may sometimes be interchangeably used. It should be noted that consistent meanings are expressed when differences are not emphasized.

In the embodiments of this application, information, signal, message, channel, or signaling may be interchangeably used sometimes. It should be noted that consistent meanings are expressed when differences are not emphasized. "of," "corresponding," and "relevant" may sometimes be interchangeably used. It should be noted that consistent meanings are expressed when differences are not emphasized.

In the embodiments of this application, a subscript, for example, W1, may sometimes be written in an incorrect form such as W1. Consistent meanings are expressed when differences are not emphasized.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

Figure 3:
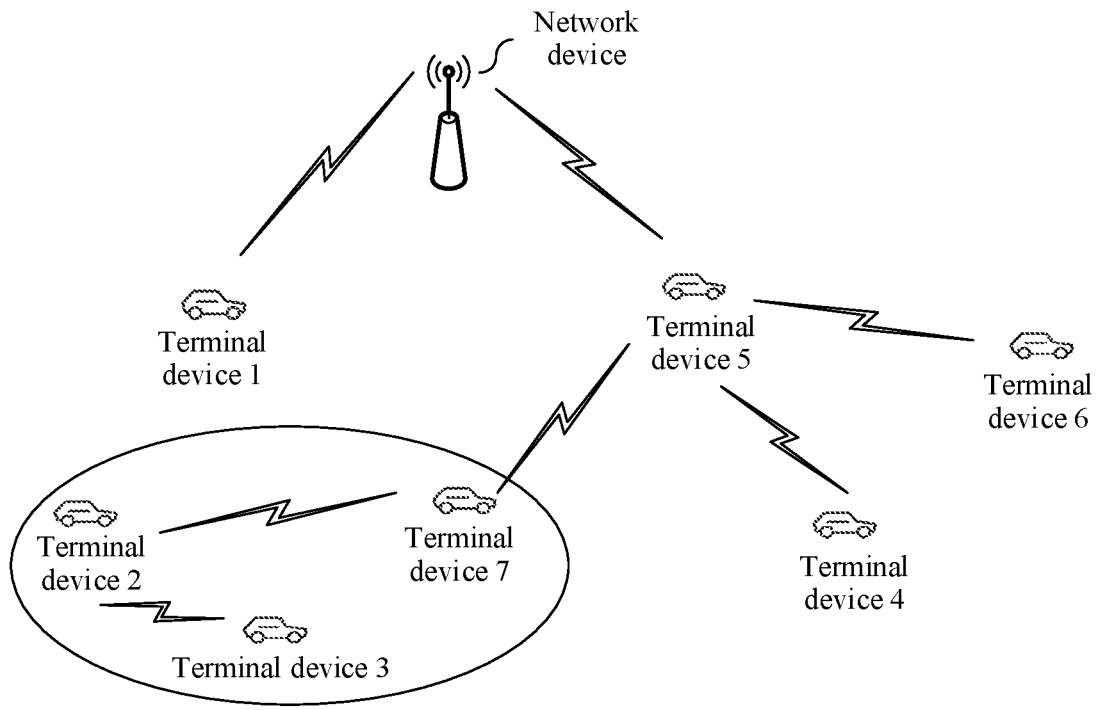
FIG. 3 is a schematic architectural diagram of a communications system according to an embodiment of this application.

Some scenarios in the embodiments of this application are described by using a scenario in a communications system shown in FIG. 3 as an example. It should be noted that the solutions in the embodiments of this application may be further applied to another mobile communications system, and a name may correspondingly be replaced with a name of a corresponding function in the another mobile communications system.

For ease of understanding the embodiments of this application, a communications system shown in FIG. 3 are first used as an example to describe in detail a communications system applicable to the embodiments of this application. FIG. 3 is a schematic architectural diagram of a communications system to which a method for reporting a buffer status report is applicable according to an embodiment of this application. As shown in FIG. 3, the communications system includes one or more terminal devices such as a terminal device 1 to a terminal device 7, and one or more network devices.

The terminal device and the network device may communicate with each other through a Uu interface over an uplink (UL) and/or a downlink (DL). Over the UL, the terminal device is a sender, and the network device is a receiver. Over the DL, the network device is a sender, and the terminal device is a receiver.

It should be understood that the foregoing different terminal devices may communicate with each other through a PC5 interface over a sidelink (SL). Over the SL, a terminal device is a sender, and another terminal device or other terminal devices are receivers.

It should be understood that FIG. 3 merely shows, as an example, signals between some terminals and signals between some terminals and the network device. Signals may also be sent or received between other terminals, and signals may also be sent or received between other terminals and the network device.

It should be understood that both a UL and an SL may satisfy a plurality of standards such as LTE and NR. When the following specific comparison between a UL and an SL and between SLs is performed, specific standards are not limited. For example, the comparison may be performed between an NR UL and an NR SL, or may be performed between an NR UL and an LTE SL, or may be performed between an LTE UL and an NR SL. For example, for a same interface, the comparison between SLs is limited to comparison between an NR SL and an LTE SL.

In some communication scenarios, when a terminal device has uplink data and sidelink data, the terminal device may be triggered to send a UL BSR and an SL BSR to a network device. In this case, the terminal device needs to determine a priority of the UL BSR and a priority of the SL BSR, namely, determines priorities for multiplexing/encapsulating the UL BSR and the SL BSR in a same MAC PDU. Specifically, when there are limited uplink resources, the uplink resources are insufficient to simultaneously carry a UL BSR MAC CE, a UL BSR MAC CE subheader, an SL BSR MAC CE, and an SL BSR MAC CE subheader, or are insufficient to simultaneously carry a UL BSR MAC CE and an SL BSR MAC CE, or are insufficient to simultaneously carry a UL BSR MAC CE, a UL BSR MAC CE subheader, and an SL BSR MAC CE, or are insufficient to simultaneously carry a UL BSR MAC CE, an SL BSR MAC CE, and an SL BSR MAC CE subheader. Alternatively, in another case, the terminal device needs to determine the priority of the UL BSR and the priority of the SL BSR, to determine whether to preferentially encapsulate a UL BSR MAC CE and a UL BSR MAC CE subheader in a UL MAC PDU, or to preferentially encapsulate an SL BSR MAC CE and an SL BSR MAC CE subheader in the UL MAC PDU.

In a possible implementation, a fixed priority sequence for the UL BSR and the SL BSR is stipulated in an existing LTE logical channel priority related protocol. To be specific, it is stipulated that in LTE, a priority of a non-padding SL BSR is always lower than a priority of a non-padding UL BSR. In other words, a priority of the UL BSR is always higher than a priority of the SL BSR. In this case, when there is a high-priority sidelink service or high-priority sidelink data for triggering the SL BSR, and there is a low-priority uplink service or low-priority uplink data for triggering the UL BSR, the terminal device always preferentially encapsulates the UL BSR MAC CE in the UL MAC PDU. As a result, the UL BSR triggered based on the low-priority service preempts resources used for the SL BSR triggered based on the high-priority service, and transmission of the SL BSR triggered based on the high-priority sidelink service may be delayed. Further, transmission of the high-priority sidelink data may be delayed accordingly. In other words, transmission efficiency of the high-priority sidelink data is relatively low.

Figure 5:
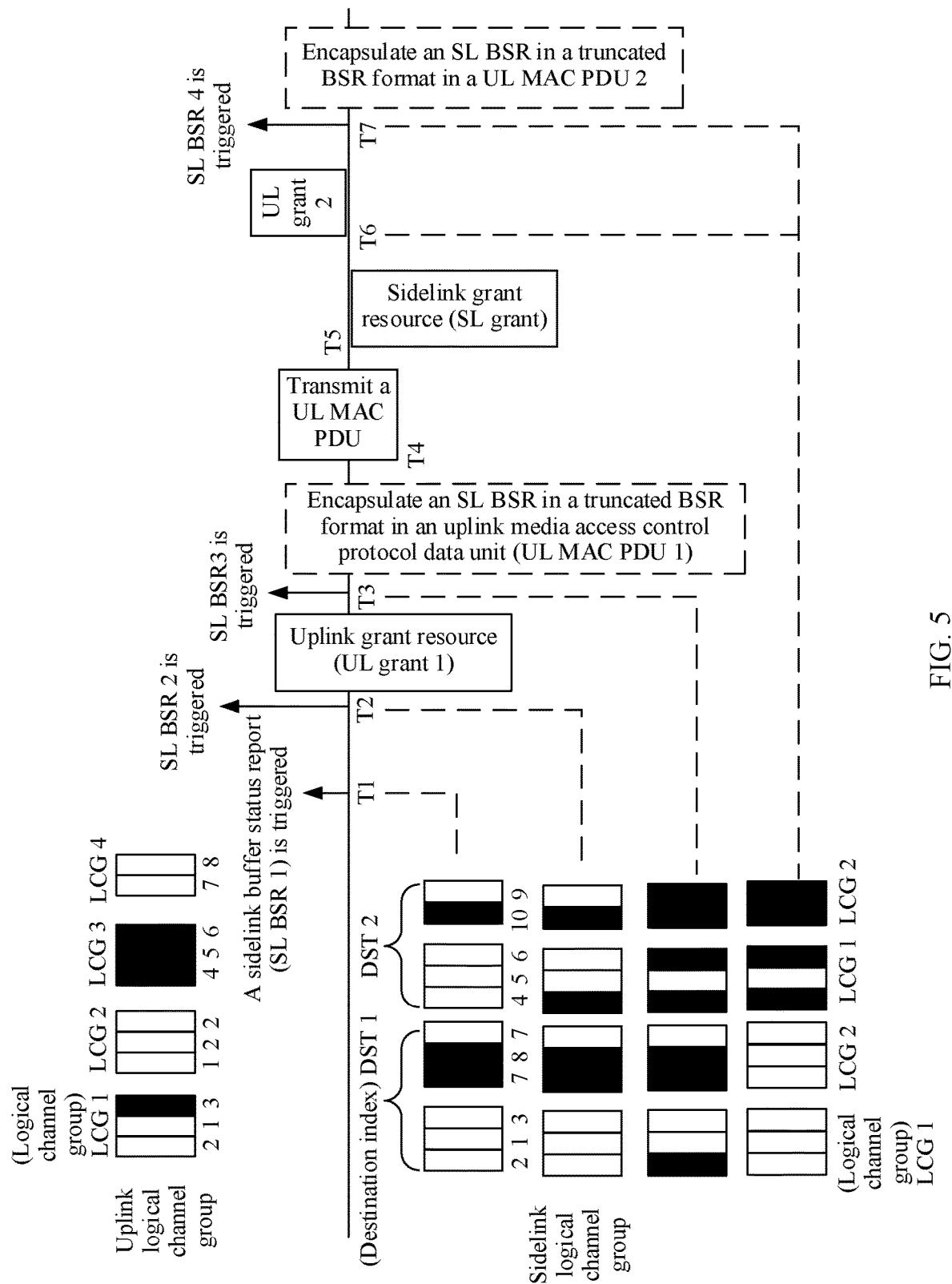
FIG. 5 is a schematic diagram of a priority comparison principle according to an embodiment of this application.

In a possible implementation, a flexible priority solution is further provided for the UL BSR and the SL BSR in the existing solution. A priority of an LCH with a highest priority (highest LCH priority) in one or more priorities corresponding to one or more LCHs for triggering the SL BSR may be considered as a priority of the SL BSR, and a priority of an LCH with a highest priority in one or more priorities corresponding to one or more LCHs for triggering the UL BSR may be considered as a priority of the UL BSR. For example, in the LCHs for triggering the SL BSR, a priority value of an LCH 1 is 7, and a priority value of an LCH 2 is 2. It is assumed that a larger priority value indicates a lower priority. A priority of the LCH 2 is higher than a priority of the LCH 1, and the priority of the LCH 2 may be considered as the priority of the SL BSR. In the LCHs for triggering the UL BSR, a priority value of an LCH 3 is 7, a priority value of an LCH 4 is 2, and a priority value of an LCH 5 is 1. The LCH 5 has the highest priority, and the priority of the LCH 5 may be considered as the priority of the UL BSR. In this case, the terminal device determines that the priority of the UL BSR is higher by comparing the priority of the SL BSR (namely, the priority of the LCH 2, where the value is 2) with the priority of the UL BSR (namely, the priority of the LCH 5, where the value is 1). In this flexible priority manner, an obtained priority result is inaccurate. Specifically, as shown in FIG. 5, a rectangular box filled in black represents a logical channel having data, and a blank rectangular box represents a logical channel having no data. At a moment T1, there is to-be-sent data on logical channels whose priorities are 7, 8, and 10, and an SL BSR 1 is triggered. A highest priority in the priorities corresponding to the logical channels is 7, and the priority 7 may be considered as a priority of the SL BSR 1. Likewise, at a moment T2, there is to-be-sent data on logical channels whose priorities are 7, 8, 10, and 4, and an SL BSR 2 is triggered. A highest priority in the priorities corresponding to the logical channels is 4. In this case, a priority of the SL BSR 2 is 4. Likewise, at a moment T3, a priority of an SL BSR 3 is 2. At a moment T4, the terminal needs to send a UL MAC PDU 1 to the network device on an uplink grant resource 1 (a UL grant 1). If the UL grant 1 has a limited size, the terminal needs to compare the priority of the SL BSR with the priority of the UL BSR. A highest priority in the priorities corresponding to the SL BSR 1 to the SL BSR 3 is 2. In this case, it is considered that the priority of the SL BSR is 2. Likewise, the priority of the UL BSR is 3. If the SL BSR has a higher priority, the terminal preferentially encapsulates the SL BSR MAC CE and the SL BSR MAC CE subheader in the UL MAC PDU 1. If the UL MAC PDU 1 can further carry other content, the terminal encapsulates the UL BSR MAC CE and the UL BSR MAC CE subheader in the UL MAC PDU 1. In a scenario shown in FIG. 5, because the SL BSR MAC CE has a relatively large size, an SL BSR MAC CE in a truncated BSR format is encapsulated in the UL MAC PDU 1. At a moment T5, the terminal device obtains a sidelink grant resource (SL grant) allocated by the network device to the terminal device, so that the terminal device sends some sidelink data through the SL grant. As shown in FIG. 5, before a moment T6 is reached, sidelink data on logical channels whose priority values are 2, 7, and 8 has been sent. In a current mechanism, at the moment T6, if an uplink grant resource 2 (a UL grant 2) obtained by the terminal device has a limited size, the terminal device needs to compare the priority of the SL BSR with the priority of the UL BSR. In addition, according to a current BSR reporting mechanism, if an SL BSR MAC CE in a truncated BSR format is encapsulated in a UL MAC PDU at a moment, an SL BSR that is pending before the moment cannot be canceled. In other words, the SL BSR that is pending before the moment continues to remain in a pending state. At the moment T6, because the SL BSR 1 to the SL BSR 3 that are previously triggered and pending remain in a pending state, and another SL BSR with a higher priority is not triggered, the terminal device still obtains the highest priority in the priorities corresponding to the LCHs corresponding to the triggered SL BSR 1 to SL BSR 3, and the value is still 2. In addition, as shown in FIG. 5, a highest priority that is in priorities corresponding to LCHs for triggering the UL BSR and that is obtained by the terminal device is 3. In this way, the priority of the SL BSR is still higher. It can be learned that in this priority comparison manner, a priority of a previously pending SL BSR is likely to keep higher, and the terminal device is likely to continuously and preferentially multiplex the SL BSR. However, actually, the SL BSR includes buffer status information of an SL LCG or an SL LCH with a low priority. Consequently, reporting of a UL BSR including buffer status information of a UL LCH or a UL LCG with a high priority is delayed, transmission of uplink data is delayed, and transmission efficiency of the uplink data is not high.

In addition, although the flexible priority manner can reduce, to some extent, a probability of always preferentially encapsulating the UL BSR MAC CE, in the flexible priority manner, when it is determined that a priority of a BSR is relatively high, for example, a priority of an SL BSR is relatively high, an SL BSR MAC CE is preferentially encapsulated in the UL MAC PDU. It is easy to understand that the SL BSR MAC CE may include buffer status information (for example, a buffer size) corresponding to some high-priority sidelink services, and may further include buffer status information corresponding to some low-priority sidelink services, and priorities corresponding to these low-priority sidelink services may be lower than priorities of some uplink services. In other words, the buffer status information of the some low-priority sidelink services may preempt resources used for the buffer status information of the some high-priority uplink services. Consequently, transmission of the buffer status information of the high-priority uplink services is delayed, and transmission of high-priority uplink data may be delayed.

In a possible solution, when determining the priority of the UL BSR and the priority of the SL BSR, the terminal device neither considers the priority of the LCH with the highest priority in the priorities corresponding to the LCHs for triggering the SL BSR, as the priority of the SL BSR; nor considers the priority of the LCH with the highest priority in the priorities corresponding to the LCHs for triggering the UL BSR as the priority of the UL BSR. Instead, the terminal device considers a priority of a sidelink service with a highest priority in one or more priorities corresponding to one or more sidelink services having data, as the priority of the SL BSR; and considers a priority of an uplink service with a highest priority in one or more priorities corresponding to one or more uplink services having data, as the priority of the UL BSR. In this way, the terminal device may determine a priority comparison result between the UL BSR and the SL BSR at a current moment based on data that actually exists at the current moment, and the obtained priority comparison result satisfies a service requirement better. The current moment is not specifically limited to a specific moment. For example, the current moment may be a moment for determining the priority of the UL BSR or the priority of the SL BSR, or may be a moment for encapsulating the UL BSR, or may be a moment for receiving an uplink resource. For example, in FIG. 5, at the moment T6, in SL LCHs whose priority values are 4, 6, 10, and 9 and UL LCHs whose priority values are 3, 4, 5, and 6, a UL LCH has a highest priority (with the value of 3). In this case, the UL BSR triggered based on the UL LCH should be preferentially sent, so that the terminal can preferentially send high-priority uplink data subsequently. This satisfies a service requirement of preferentially sending the high-priority uplink data. In addition, the priority comparison result is not affected by a previously pending BSR. Therefore, the priority comparison result is more accurate.

In a possible solution, the terminal device determines the priority of the UL BSR and the priority of the SL BSR based on a size of a first uplink resource.

In a possible solution, the terminal device generates a first BSR and sends the first BSR. The first BSR includes buffer status information of a service that satisfies a first condition. The first condition is that a priority of the service is greater than or equal to a first threshold. In the existing solution, a BSR sent on an uplink resource at a time may include buffer status information of a high-priority service and buffer status information of a low-priority service, and the buffer status information of the low-priority service may occupy more resources. Compared with the existing solution, in the embodiments of this application, buffer status information of a service with a higher priority may be preferentially sent on an uplink resource. This decreases a probability that buffer status information of a service with a lower priority occupies more resources.

In a possible solution, optionally, when there are limited uplink resources at a time, the terminal device determines, based on the foregoing method, that a BSR needs to be preferentially multiplexed.

It should be noted that the "MAC CE" may be implemented in one or more of the following manners: a MAC CE preconfigured by the network device, a MAC CE dynamically configured by the network device through signaling, or a MAC CE predefined in a protocol and written into an internal buffer of the terminal device when the terminal device is manufactured or accesses a network. A specific implementation of the "MAC CE" is not specifically limited in this application.

It should be noted that specific implementations of the foregoing design solutions are to be described in detail in subsequent method embodiments. Details are not described herein.

Optionally, the network device is a device that is located on a network side of the communications system and that has a wireless transceiving function, or a chip or a chip system that may be disposed in the device. The network device includes but is not limited to: an access point (AP) in a wireless fidelity (Wi-Fi) system, such as a home gateway, a router, a server, a switch, and a bridge, an evolved NodeB (eNB), a radio network controller (RNC), a NodeB (NB), a base station controller (BSC), a base transceiver station (BTS), a home base station (for example, a home evolved NodeB, or a home NodeB (HNB)), a baseband unit (BBU), a wireless relay node, a wireless backhaul node, a transmission point (TRP or TP), or the like. The network device may alternatively be a gNB or a transmission point (TRP or TP) in a 5G system, for example, an NR system, one base station or a group of base stations (including a plurality of antenna panels) in a 5G system. The network device may alternatively be a network node, such as a baseband unit (BBU), a distributed unit (DU), or a road side unit (RSU) having a base station function, that constitutes a gNB or a transmission point.

Optionally, the terminal device may be a vehicle, an in-vehicle communications apparatus or an in-vehicle terminal that is installed on a vehicle and that is configured to assist the vehicle in traveling, or a chip in an in-vehicle communications apparatus or an in-vehicle terminal. The in-vehicle terminal may be a device configured to implement a wireless communication function, for example, a terminal or a chip that can be used in a terminal. The terminal may be user equipment (UE), an access terminal, a terminal unit, a terminal station, a mobile station, a mobile console, a remote station, a remote terminal, a mobile device, a wireless communications device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine, a wireless terminal in smart grid, a wireless terminal in transportation safety, a wireless terminal in smart city, a wireless terminal in smart home, or the like. The in-vehicle terminal may be movable or fixed.

It should be understood that FIG. 3 is only a simplified schematic diagram of an example of the communications system for ease of understanding. The communications system may further include other network devices and/or other terminal devices that are not shown in FIG. 3.

Optionally, the network device and the terminal device in the embodiments of this application may also be collectively referred to as a communications apparatus. The communications apparatus may be a general-purpose device or a dedicated device. This is not specifically limited in the embodiments of this application.

Figure 4:
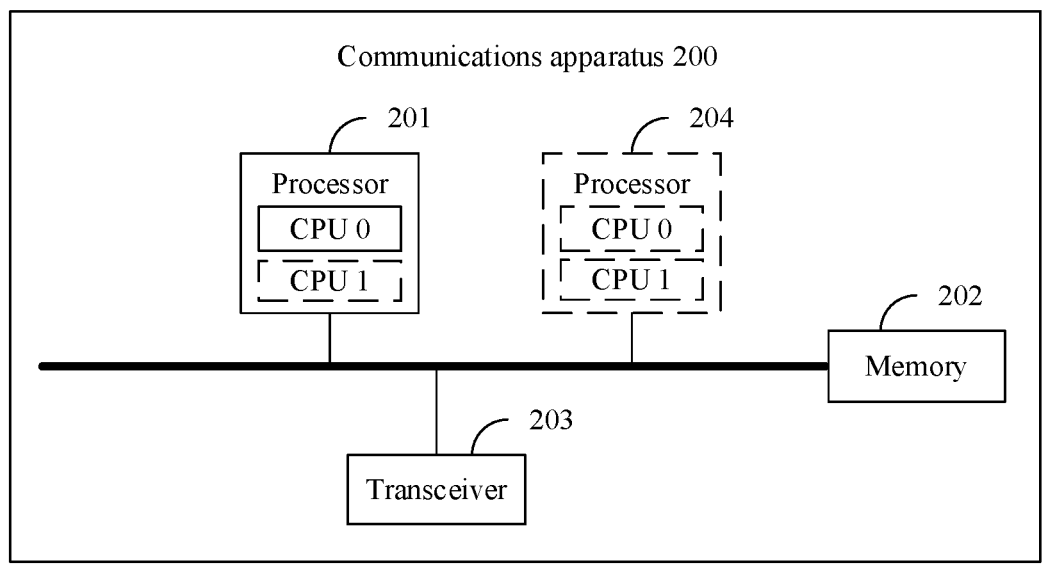
FIG. 4 is a schematic structural diagram of a communications apparatus according to an embodiment of this application.

FIG. 4 is a schematic structural diagram of a communications apparatus 200 according to an embodiment of this application. As shown in FIG. 4, the communications apparatus 200 may be a terminal device or a network device, or may be a chip applied to a terminal device or a network device, or another component, module, subsystem, or the like that has a terminal function or a network device function. As shown in FIG. 4, the communications apparatus 200 may include a processor 201, a memory 202, and a transceiver 203. There is a signal connection between the processor 201, the memory 202, and the transceiver 203. For example, the processor 201, the memory 202, and the transceiver 203 may be connected through a communications bus.

The following describes components of the communications apparatus 200 in detail with reference to FIG. 4.

The processor 201 is a control center of the communications apparatus 200, and may be one processor or may be a collective term of a plurality of processing elements. For example, the processor 201 may be one or more central processing units (CPU), or an application-specific integrated circuit (ASIC), or may be configured as one or more integrated circuits implementing the embodiments of this application, for example, one or more microprocessors (DSP) or one or more field programmable gate arrays (FPGA).

The processor 201 may execute various functions of the communications apparatus 200 by running or executing a software program stored in the memory 202 and invoking data stored in the memory 202.

In a specific implementation, in an embodiment, the processor 201 may include one or more CPUs, for example, a CPU 0 and a CPU 1 that are shown in FIG. 4.

In a specific implementation, in an embodiment, the communications apparatus 200 may alternatively include a plurality of processors, for example, the processor 201 and a processor 204 that are shown in FIG. 4. Each of the processors may be a single-core (single-CPU) processor or may be a multi-core (multi-CPU) processor. The processor herein may be one or more communications devices, circuits, and/or processing cores configured to process data (for example, a computer program instruction).

The memory 202 may be a read-only memory (ROM) or another type of static storage communications device that can store static information and an instruction; or a random access memory (RAM) or another type of dynamic storage communications device that can store information and an instruction. The memory 23 may alternatively be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage communications device, or any other medium that can be used to carry or store expected program code in a form of an instruction or a data structure and that is accessible by a computer, but is not limited thereto. The memory 202 may exist independently, or may be integrated with the processor 201.

The memory 202 is configured to store a software program used to perform the solutions of this application, and the processor 201 controls execution of the software program. For a specific implementation, refer to the following method embodiments. Details are not described herein.

The transceiver 203 is configured to perform communication between the communications apparatus 200 and another communications apparatus. The transceiver 203 may include a receiving unit for implementing a receiving function and a sending unit for implementing a sending function.

It should be noted that a structure of the communications apparatus 200 shown in FIG. 4 does not constitute a limitation on the communications apparatus. An actual communications apparatus may include more or fewer components than those shown in FIG. 4, or combine some components, or have different component arrangements.

The following specifically describes a method for reporting a buffer status report provided in the embodiments of this application with reference to the accompanying drawings.

In the embodiments of this application, different sidelink services may correspond to different destination layer-1 identifiers, and/or correspond to different destination layer-2 identifiers (Destination Index), or may correspond to a same destination layer-1 identifier and/or a same destination layer-2 identifier. Different sidelink services may correspond to different destination layer-1 identifiers+source layer-1 identifier pairs (source Index pair), and/or correspond to different destination layer-2 identifiers+source layer-2 identifier pairs. Different sidelink services may correspond to a same destination layer-1 identifier+source layer-1 identifier group, and/or correspond to a same destination layer-2 identifier+source layer-2 identifier group.

Figure 6A:
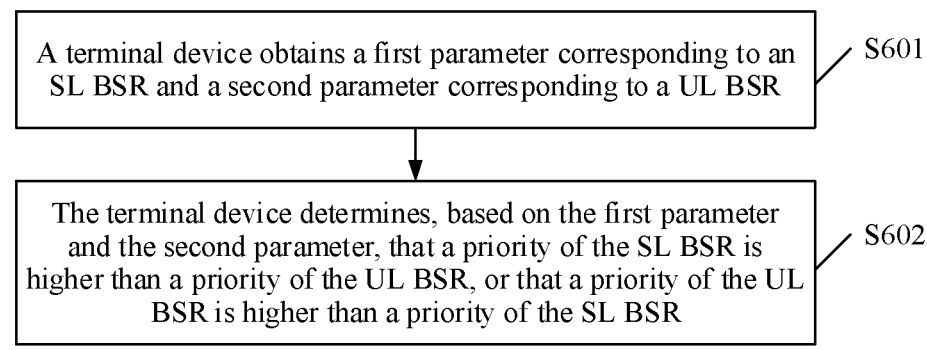
FIG. 6(a) to FIG. 6(c) are schematic flowcharts of methods for reporting a buffer status report according to embodiments of this application.

FIG. 6(a) is a schematic flowchart 1 of a method for reporting a buffer status report according to an embodiment of this application. The method for reporting a buffer status report may be applied to a case in which the terminal device shown in FIG. 3 reports an SL BSR and/or a UL BSR to the network device.

As shown in FIG. 6(a), the method for reporting a buffer status report includes the following steps.

S601: The terminal device obtains a first parameter corresponding to the SL BSR and a second parameter corresponding to the UL BSR.

In this embodiment of this application, it should be noted that, optionally, a parameter such as a priority may be predefined for an SL BSR MAC CE, and the priority is used to indicate a priority of the SL BSR MAC CE in a logical channel prioritization (LCP) multiplexing process. The priority may be defined as being the same as or different from priorities corresponding to a plurality of pending SL BSRs, or may be the same as or different from priorities of SL LCHs/SL LCGs for triggering a plurality of SL BSRs. Likewise, optionally, a priority is defined for a UL BSR MAC CE. The priority is used to indicate a priority relationship of the UL BSR MAC CE in an LCP multiplexing process. The priority may be the same as or different from priorities corresponding to a plurality of pending UL BSRs, or may be the same as or different from priorities of UL LCHs/UL LCGs for triggering a plurality of UL BSRs. Alternatively, the priority is related to a PPPP or a 5QI. Alternatively, the priority is related to other parameters.

Alternatively, in this embodiment of this application, the priority is not predefined for the SL BSR MAC CE and/or the UL BSR MAC CE, and a priority corresponding to the first parameter and a priority corresponding to the second parameter are respectively considered as a priority of the SL BSR and a priority of the UL BSR. Alternatively, a priority corresponding to the first parameter and a priority corresponding to the second parameter are respectively considered as a priority of the SL BSR MAC CE in a process of multiplexing and encapsulating the SL BSR MAC CE in a MAC PDU and a priority of the UL BSR MAC CE in a process of multiplexing and encapsulating the UL BSR MAC CE in a MAC PDU.

Alternatively, in the present invention, the priority is not predefined for the SL BSR MAC CE and/or the UL BSR MAC CE. Instead, only when a sequence relationship (or a relative priority sequence) between the UL BSR MAC CE and the SL BSR MAC CE needs to be determined in an LCP multiplexing and encapsulation process, the priority is determined based on the first parameter related to the SL BSR and the second parameter related to the UL BSR.

The first parameter is related to a priority of a sidelink service having data, and the second parameter is related to a priority of an uplink service having data. Specifically, the first parameter is a priority of a sidelink service with a highest priority in one or more priorities corresponding to one or more sidelink services having sidelink data; and/or the second parameter is a priority of an uplink service with a highest priority in one or more priorities corresponding to one or more uplink services having uplink data.

In another possible implementation, the first parameter is a priority of an SL LCH with a highest priority in SL LCHs included in an SL LCG corresponding to an LCG ID included in the SL BSR MAC CE; and/or the second parameter is a priority of a UL LCH with a highest priority in UL LCHs included in a UL LCG corresponding to an LCG ID included in the UL BSR MAC CE.

In the UL BSR MAC CE, each LCG corresponds to one indication bit. An indication bit corresponding to an LCG is used to indicate whether the UL BSR MAC CE includes a buffer size field for the LCG. For example, if the bit is 1, it indicates that the UL BSR MAC CE includes a corresponding buffer size field for the LCG.

The second parameter is a priority of a UL LCH with a highest priority in UL LCHs included in a UL LCG corresponding to an indication bit of 1 in the UL BSR MAC CE, or the second parameter is a priority of a UL LCH with a highest priority in UL LCHs included in a UL LCG corresponding to a buffer size field in the UL BSR MAC CE.

"Available data (available)" means that there is to-be-transmitted data, available data, or valid data.

A sidelink service includes one or more of the following: an SL QoS flow, an SL LCH, an SL DRB, an SL LCG, an SL service destination identifier (Destination Index), and an SL PDU session. An uplink service includes one or more of the following: a UL QoS flow, a UL LCH, a UL DRB, a UL LCG, a UL service destination identifier, and a UL PDU session.

In a possible implementation, if the sidelink service is the SL LCH, the first parameter is a priority of an SL LCH with a highest priority in one or more priorities corresponding to one or more SL LCHs having sidelink data; and/or if the uplink service is the UL LCH, the second parameter is a priority of a UL LCH with a highest priority in one or more priorities corresponding to one or more UL LCHs having uplink data. In this embodiment of this application, the priority may be represented by a value. A larger value indicates a lower priority, and a smaller value indicates a higher priority. Alternatively, a larger value indicates a higher priority, and a smaller value indicates a lower priority. A specific magnitude relationship between a priority value and a priority is not limited in this embodiment of this application. Alternatively, the priority may also be represented by a classification. For example, priorities are classified into one or more classifications, for example, a classification A and a classification B. Different priorities have different classifications. It may be predefined or preconfigured that a priority of the classification A may be higher than a priority of the classification B, or that a priority of the classification B may be higher than a priority of the classification A. The following mainly describes the technical solutions in the embodiments of this application by using an example in which a priority value represents a specific priority and a larger priority value indicates a lower priority. A general description is provided herein, and details are not described below. Certainly, a case that a classification is used to represent a specific priority or another manner is used to represent a specific priority is also applicable to the solutions in the following embodiments.

Figure 7:
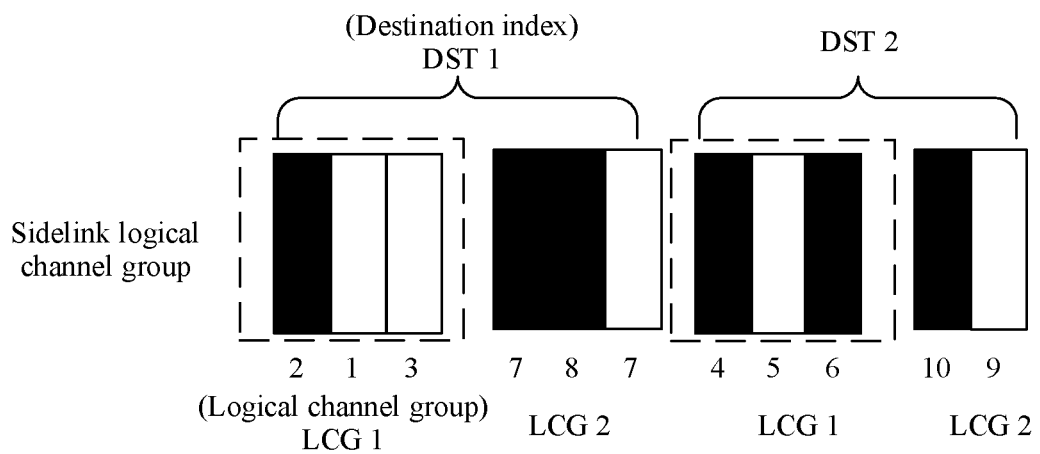
FIG. 7 is a schematic diagram of a priority comparison principle according to an embodiment of this application.

For example, FIG. 5 is used as an example. At a moment T6, priority values corresponding to SL LCHs having sidelink data are 4, 6, 10, and 9, and an SL LCH whose priority value is 4 has a highest priority. In this case, the first parameter is a priority of the SL LCH (where the priority value is 4). Likewise, for the UL BSR, priority values corresponding to UL LCHs having uplink data are 3, 4, 5, and 6, and a UL LCH whose priority value is 3 has a highest priority. In this case, the second parameter is a priority of the UL LCH (where the priority value is 3). The second parameter may be used to indicate a priority of the UL BSR. For another example, FIG. 7 is used as an example. FIG. 7 shows a principle of obtaining a first parameter corresponding to an SL BSR. Priority values corresponding to LCHs having sidelink data are 2, 7, 8, 4, 6, and 10, and an LCH whose priority value is 2 has a highest priority. Therefore, in this case, the priority corresponding to the LCH having the highest priority is used as the first parameter corresponding to the SL BSR.

In a possible implementation, the sidelink service is the SL LCG, the first parameter is a priority of an SL LCG with a highest priority in one or more priorities corresponding to one or more SL LCGs having sidelink (SL) data; and/or if the uplink service is the UL LCG, the second parameter is a priority of a UL LCG with a highest priority in one or more priorities corresponding to one or more UL LCGs having uplink (UL) data. A priority corresponding to an LCG is a priority of an LCH with a highest priority in one or more priorities corresponding to one or more LCHs included in the LCG. FIG. 7 is used as an example. Each of four SL LCGs shown in FIG. 7 includes sidelink data. A priority of an LCG 1 corresponding to a DST 1 is 1, a priority of an LCG 2 corresponding to the DST 1 is 7, a priority of an LCG 1 corresponding to a DST 2 is 4, and a priority of an LCG 2 corresponding to the DST 2 is 9. A priority corresponding to the LCG 1 corresponding to the DST 1 is the highest. Therefore, in this case, the priority corresponding to the LCG 1 corresponding to the DST 1 is used as the first parameter corresponding to the SL BSR.

In a possible implementation, the sidelink service is the SL LCG, the first parameter is a priority of an SL LCH with a highest priority in SL LCHs included in one or more SL LCGs corresponding to one or more LCG IDs included in the SL BSR MAC CE; and/or if the uplink service is the UL LCG, the second parameter is a priority of a UL LCH with a highest priority in UL LCHs included in one or more UL LCGs corresponding to one or more indication bits with a value "i" in the UL BSR MAC CE.

In this embodiment of this application, a priority corresponding to an LCG is a priority of an LCH with a highest priority in one or more priorities corresponding to one or more LCHs included in the LCG.

For example, FIG. 5 is used as an example. When a MAC PDU 2 is constructed, a complete SL BSR MAC CE should include buffer statuses of an LCG 1 and an LCG 2 that correspond to the DST 2. In all SL LCHs included in the two SL LCGs, a priority of an LCH with a highest priority is 4. In this case, the first parameter is 4. A complete UL BSR MAC CE should include buffer statuses of an LCG 1 and an LCG 3. In all UL LCHs included in the two UL LCGs, a priority of an LCH with a highest priority is 3. In this case, the first parameter is 3.

S602: The terminal device determines, based on the first parameter and the second parameter, that a priority of the SL BSR is higher than a priority of the UL BSR, or that a priority of the UL BSR is higher than a priority of the SL BSR.

Specifically, if the first parameter is greater than the second parameter, the terminal device determines that the priority of the SL BSR is higher than the priority of the UL BSR; or if the first parameter is less than or equal to the second parameter, the terminal device determines that the priority of the UL BSR is higher than the priority of the SL BSR.

FIG. 5 is used as an example. With reference to the foregoing examples, if the uplink service is the UL LCH, and the sidelink service is the SL LCH, at the moment T6 shown in FIG. 5, the first parameter corresponding to the SL BSR is the priority corresponding to the priority value 4, and the second parameter corresponding to the UL BSR is the priority corresponding to the priority value 3. In this case, the priority represented by the priority value 4 is lower than the priority represented by the priority value 3, in other words, the priority of the SL BSR is lower than the priority of the UL BSR. To be specific, when a size of a UL grant is less than a sum of a size of the UL BSR MAC CE, a size of a UL BSR MAC CE subheader, a size of the SL BSR MAC CE, and a size of an SL BSR MAC CE subheader, the terminal device preferentially encapsulates the UL BSR MAC CE and the UL BSR MAC CE subheader in a UL MAC PDU, and then encapsulates the SL BSR MAC CE in the UL MAC PDU if there is a remaining resource, to preferentially request to schedule an uplink resource used to transmit uplink data.

In some embodiments, the first parameter is a value of the priority of the sidelink service with the highest priority in the one or more priorities corresponding to the one or more sidelink services having the sidelink data; and/or the second parameter is a value of the priority of the uplink service with the highest priority in the one or more priorities corresponding to the one or more uplink services having the uplink data. In this case, if the first parameter (the value of the priority) corresponding to the SL BSR is greater than the second parameter corresponding to the UL BSR, it indicates that the priority of the SL BSR is lower than the priority of the UL BSR.

In some embodiments, the first parameter is a classification of the priority of the sidelink service with the highest priority in the one or more priorities corresponding to the one or more sidelink services having the sidelink data; and/or the second parameter is a classification of the priority of the uplink service with the highest priority in the one or more priorities corresponding to the one or more uplink services having the uplink data. In this case, the priority of the SL BSR and the priority of the UL BSR may be predefined or configured.

According to the method for reporting a buffer status report provided in this embodiment of this application, the terminal device obtains the first parameter corresponding to the SL BSR and the second parameter corresponding to the UL BSR, and determines the priority of the UL BSR and the priority of the SL BSR based on the first parameter and the second parameter. The first parameter is related to a priority of a sidelink service having sidelink data, and the second parameter is related to a priority of an uplink service having uplink data. In the existing solution, a terminal device may continuously preferentially encapsulate an SL BSR MAC CE or a UL BSR MAC CE, and then transmission of uplink data or sidelink data is delayed because a priority of a UL BSR and a priority of an SL BSR are determined by comparing a priority of an LCH with a highest priority in priorities corresponding to LCHs for triggering the UL BSR with a priority of an LCH with a highest priority in priorities corresponding to LCHs for triggering the SL BSR. Compared with the existing solution, in the technical solution in this embodiment of this application, the priority of the UL BSR and the priority of the SL BSR are determined based on a priority of a sidelink service actually having sidelink data and/or a priority of an uplink service actually having uplink data, and an obtained priority comparison result satisfies a service requirement better. In this way, the terminal device can preferentially send high-priority uplink data or high-priority sidelink data subsequently. This improves efficiency of sending uplink data or sidelink data.

As shown in FIG. 6(*b*), a method for reporting a buffer status report includes the following steps.

S603: A terminal device obtains a third parameter corresponding to an SL BSR, a fourth parameter corresponding to a UL BSR, and/or a second threshold.

In this embodiment of this application, it should be noted that, optionally, a priority is defined for a UL BSR MAC CE. The priority is used to indicate a priority relationship of the UL BSR MAC CE in an LCP multiplexing process. The priority may be the same as or different from priorities corresponding to a plurality of pending UL BSRs, or may be the same as or different from priorities of UL LCHs/UL LCGs for triggering a plurality of UL BSRs.

Alternatively, in this embodiment of this application, a priority is not defined for an SL BSR MAC CE and/or a UL BSR MAC CE, and a priority corresponding to a value of a first parameter and a priority corresponding to a value of a second parameter are respectively considered as a priority of the SL BSR and a priority of the UL BSR. Alternatively, a priority corresponding to a value of a first parameter and a value of a second parameter are respectively considered as a priority of an SL BSR MAC CE in a process of multiplexing and encapsulating the SL BSR MAC CE in a MAC PDU and a priority of a UL BSR MAC CE in a process of multiplexing and encapsulating the UL BSR MAC CE in a MAC PDU.

Alternatively, in the present invention, a priority is not defined for an SL BSR MAC CE and/or a UL BSR MAC CE. Instead, only when a sequence relationship (or a relative priority sequence) between the UL BSR MAC CE and the SL BSR MAC CE needs to be determined in an LCP multiplexing and encapsulation process, the priority is determined based on the third parameter related to the SL BSR and the fourth parameter related to the UL BSR, and/or the second threshold.

The third parameter is related to a priority of a sidelink service having data, and the fourth parameter is related to a priority of an uplink service having data.

In a possible implementation, the fourth parameter is a priority of an uplink service with a highest priority in one or more priorities corresponding to one or more uplink services having uplink data; or the fourth parameter is a priority of a UL LCH with a highest priority in UL LCHs included in a UL LCG corresponding to an LCG ID included in the UL BSR MAC CE; or the fourth parameter is a priority of a UL LCH with a highest priority in UL LCHs included in a UL LCG corresponding to an indication bit with a value "1" in the UL BSR MAC CE; or the fourth parameter is a priority of a UL LCH with a highest priority in UL LCHs included in a UL LCG corresponding to a buffer size field in the UL BSR MAC CE.

Optionally, the third parameter is a quantity of sidelink services whose priorities are greater than or equal to the fourth parameter and that are in sidelink services having the sidelink data.

Optionally, the second threshold is a preconfigured value. For example, the second threshold is a value predefined in a protocol. Alternatively, the second threshold is a value preconfigured in the terminal before delivery, and optionally, the value can be subsequently updated. Alternatively, the second threshold is a value configured by a network device. Alternatively, the second threshold is the fourth parameter.

For example, the network device configures one threshold parameter for each uplink service. If the fourth parameter is associated with an uplink service, a threshold parameter in a configuration of the uplink service is used as the second threshold used to determine the priority of the SL BSR and the priority of the UL BSR. For example, SL LCHs having valid data are an SL LCH 1 to an SL LCH 8. A priority of a UL LCH 1 is 5, and a threshold parameter is 5. A priority of a UL LCH 2 is 4, and a threshold parameter is 3. A priority of a UL LCH 3 is 7, and a threshold parameter is 2. If the fourth parameter is the priority of the uplink service with the highest priority in the one or more priorities corresponding to the one or more uplink services having the uplink data, and the UL LCH 2 is a UL LCH with a highest priority in one or more priorities corresponding to one or more UL LCHs having uplink data, the priority (with the value of 4) of the UL LCH 2 is considered as the fourth parameter, and the threshold parameter associated with the UL LCH 2 is 3. In this case, the second threshold is 3.

A sidelink service includes one or more of the following: an SL QoS flow, an SL LCH, an SL DRB, an SL LCG, an SL service destination identifier (Destination Index), and an SL PDU session. An uplink service includes one or more of the following: a UL QoS flow, a UL LCH, a UL DRB, a UL LCG, a UL service destination identifier, and a UL PDU session.

In a possible implementation, the sidelink service is the SL LCH, and/or the uplink service is the UL LCH. The third parameter is a quantity of SL LCHs whose priorities are greater than or equal to the fourth parameter and that are in SL LCHs having sidelink data. The fourth parameter is the priority of the uplink service with the highest priority in the one or more priorities corresponding to the one or more uplink services having the uplink data.

For example, SL LCHs having valid data are an SL LCH 1 to an SL LCH 8 that respectively correspond to priorities 1 to 8. UL LCHs having valid data are a UL LCH 1, a UL LCH 2, and a UL LCH 3. A priority of the UL LCH 1 is 5, a priority of the UL LCH 2 is 4, and a priority of the UL LCH 3 is 7. If the fourth parameter is the priority of the uplink service with the highest priority in the one or more priorities corresponding to the one or more uplink services having the uplink data, and the UL LCH 2 is a UL LCH with a highest priority in one or more UL LCHs having uplink data, the fourth parameter is 4, and the second threshold configured by a network is 3. If there are four SL LCHs whose priorities are greater than or equal to 4 and that are in the SL LCHs having the sidelink data, the third parameter is 4.

In a possible implementation, the sidelink service is the SL LCG, the third parameter is a quantity of SL LCGs whose priorities are greater than or equal to the fourth parameter and that are in one or more SL LCGs having sidelink (SL) data; and/or if the uplink service is the UL LCG, the fourth parameter is a priority of a UL LCG with a highest priority in one or more priorities corresponding to one or more UL LCGs having uplink (UL) data. A priority corresponding to an LCG is a priority of an LCH with a highest priority in one or more priorities corresponding to one or more LCHs included in the LCG.

For example, SL LCGs having valid data are an SL LCG 1 to an SL LCG 8 that respectively correspond to priorities 1 to 8. In other words, highest priorities of SL LCHs included in the SL LCGs are 1 to 8. UL LCGs having valid data are a UL LCG 1, a UL LCG 2, and a UL LCG 3. A priority corresponding to the UL LCG 1 is 2, a priority corresponding to the UL LCG 2 is 4, and a priority corresponding to the UL LCG 3 is 7. If the fourth parameter is the priority of the uplink service with the highest priority in the one or more priorities corresponding to the one or more uplink services having the uplink data, the fourth parameter is 2, and the second threshold configured by a network is 5. In this case, there are two SL LCHs whose priorities are greater than or equal to 2 and that are in the SL LCHs having the sidelink data, in other words, the third parameter is 2.

S604: The terminal device determines, based on the third parameter and the second threshold, that the priority of the SL BSR is higher than the priority of the UL BSR, or that the priority of the UL BSR is higher than the priority of the SL BSR.

Specifically, if the third parameter is greater than or equal to the second threshold, the terminal device determines that the priority of the SL BSR is higher than the priority of the UL BSR. If the third parameter is less than the second threshold, the terminal device determines that the priority of the UL BSR is higher than the priority of the SL BSR.

For example, with reference to the foregoing examples, SL LCHs having valid data are an SL LCH 1 to an SL LCH 8 that respectively correspond to priorities 1 to 8. UL LCHs having valid data are a UL LCH 1, a UL LCH 2, and a UL LCH 3. A priority of the UL LCH 1 is 4, a priority of the UL LCH 2 is 5, and a priority of the UL LCH 3 is 7. If the fourth parameter is the priority of the uplink service with the highest priority in the one or more priorities corresponding to the one or more uplink services having the uplink data, and the UL LCH 1 is a UL LCH with a highest priority in one or more priorities corresponding to one or more UL LCHs having uplink data, the fourth parameter is 4, and the second threshold configured by a network is 3. In this case, there are four SL LCHs whose priorities are greater than or equal to 4 and that are in the SL LCHs having the sidelink data, in other words, the third parameter is 4.

Because the third parameter (4) is greater than the second threshold (3), the terminal device determines that the priority of the SL BSR is higher than the priority of the UL BSR. In other words, when a size of a UL grant is less than a sum of a size of the UL BSR MAC CE, a size of a UL BSR MAC CE subheader, a size of the SL BSR MAC CE, and a size of an SL BSR MAC CE subheader, the terminal device preferentially encapsulates the SL BSR MAC CE and the SL BSR MAC CE subheader in a UL MAC PDU, and then encapsulates the UL BSR MAC CE in the UL MAC PDU if there is a remaining resource, to preferentially request to schedule an uplink resource used to transmit uplink data.

Figure 6B:
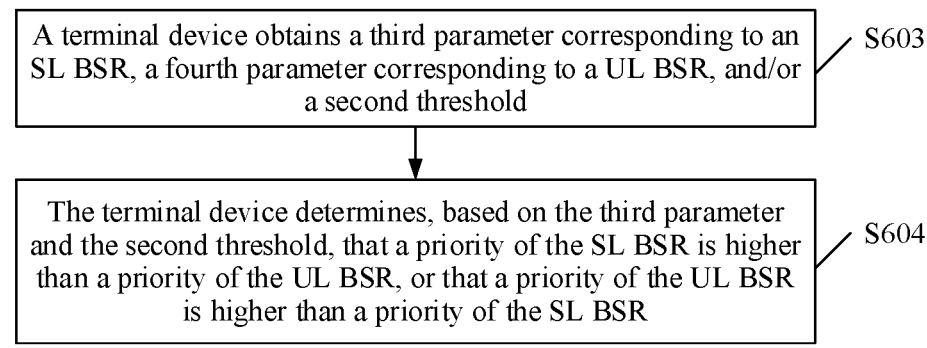

It should be noted that the technical solution corresponding to FIG. 6(*a*) and the technical solution corresponding to FIG. 6(b) are two parallel technical solutions, and S603 and S604 are not steps performed after S601 and S602, but steps independent of S601 and S602. For other similar steps, refer to the descriptions herein.

According to the communication method provided in this embodiment of this application, the terminal device obtains the third parameter corresponding to the SL BSR, the fourth parameter corresponding to the UL BSR, and the second threshold, and determines the priority of the UL BSR and the priority of the SL BSR based on the third parameter, the fourth parameter, and the second threshold. The third parameter is related to a priority of a sidelink service having sidelink data and a quantity of sidelink services, and the fourth parameter is related to a priority of an uplink service having uplink data. In the existing solution, a terminal device may continuously preferentially encapsulate an SL BSR MAC CE or a UL BSR MAC CE, and then transmission of uplink data or sidelink data is delayed because a priority of a UL BSR and a priority of an SL BSR are determined by comparing a priority of an LCH with a highest priority in priorities corresponding to LCHs for triggering the UL BSR with a priority of an LCH with a highest priority in priorities corresponding to LCHs for triggering the SL BSR. Compared with the existing solution, in the technical solution in this embodiment of this application, the priority of the UL BSR and the priority of the SL BSR are determined based on a priority of a sidelink service actually having sidelink data and/or a priority of an uplink service actually having uplink data and by limiting a quantity of sidelink services that satisfy a condition, and an obtained priority comparison result satisfies a service requirement better. In this way, the terminal device can preferentially send high-priority uplink data or high-priority sidelink data subsequently. This improves efficiency of sending uplink data or sidelink data.

Figure 6C:
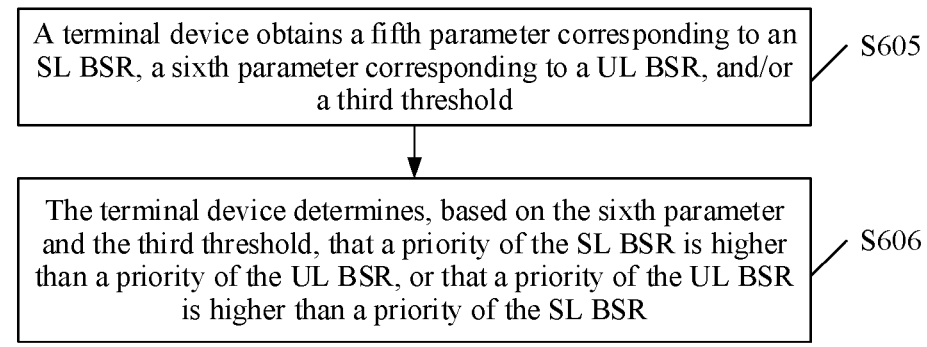

Certainly, as shown in FIG. 6(c), a method for reporting a buffer status report includes the following steps.

S605: A terminal device obtains a fifth parameter corresponding to an SL BSR and a sixth parameter corresponding to a UL BSR, and/or a third threshold.

The fifth parameter is related to a priority of a sidelink service having data, and the sixth parameter is related to a priority of an uplink service having data.

In a possible implementation, the fifth parameter is a priority of a sidelink service with a highest priority in one or more priorities corresponding to one or more sidelink services having sidelink data; or the fifth parameter is a priority of an SL LCH with a highest priority in SL LCHs included in an SL LCG corresponding to an LCG ID included in an SL BSR MAC CE; or the fifth parameter is a priority of an SL LCH with a highest priority in SL LCHs included in an SL LCG corresponding to an indication bit with a value "1" in an SL BSR MAC CE; or the fifth parameter is a priority of an SL LCH with a highest priority in SL LCHs included in an SL LCG corresponding to a buffer size field in an SL BSR MAC CE.

Optionally, the sixth parameter is a quantity of uplink services whose priorities are greater than or equal to the fifth parameter and that are in uplink services having uplink data.

Optionally, the third threshold is a preconfigured value. For example, the third threshold is a value predefined in a protocol. Alternatively, the third threshold is a value preconfigured in the terminal before delivery, and optionally, the value can be subsequently updated. Alternatively, the third threshold is a value configured by a network device.

S606: The terminal device determines, based on the sixth parameter and the third threshold, that a priority of the SL BSR is higher than a priority of the UL BSR, or that a priority of the UL BSR is higher than a priority of the SL BSR.

Specifically, if the sixth parameter is greater than or equal to the third threshold, the terminal device determines that the priority of the SL BSR is higher than the priority of the UL BSR. If the sixth parameter is less than the third threshold, the terminal device determines that the priority of the UL BSR is higher than the priority of the SL BSR.

For a principle of the technical solution corresponding to FIG. 6(c), refer to that in FIG. 6(b). Details are not described herein.

Figure 8:
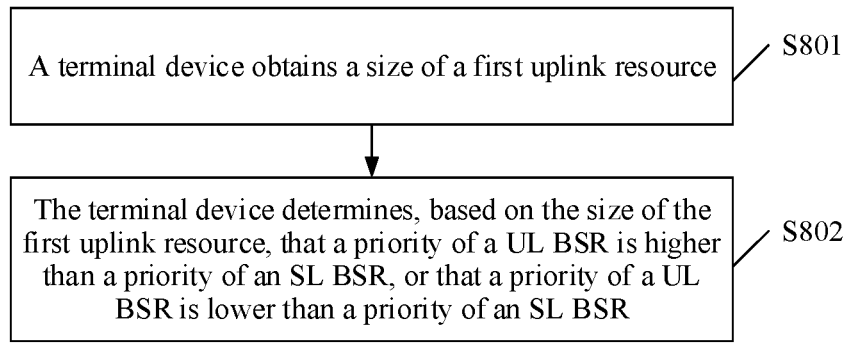
FIG. 8 and FIG. 9 are schematic flowcharts of methods for reporting a buffer status report according to embodiments of this application.

An embodiment of this application further provides a method for reporting a buffer status report. As shown in FIG. 8, the method includes the following steps.

S801: A terminal device obtains a size of a first uplink resource.

The size of the first uplink resource may be represented by a size of the first uplink resource, or the size of the first uplink resource may be a quantity of bits of the first uplink resource, or the size of the first uplink resource may be a quantity of remaining bits in the first uplink resource, or the size of the first uplink resource may be a quantity of padding bits. A specific manner of representing the size of the first uplink resource is not limited in this embodiment of this application.

S802: The terminal device determines, based on the size of the first uplink resource, that a priority of a UL BSR is higher than a priority of an SL BSR, or that a priority of a UL BSR is lower than a priority of an SL BSR.

In this embodiment of this application, the terminal device may determine the priority of the UL BSR and the priority of the SL BSR based on the size of the first uplink resource, a size of the UL BSR, and/or a size of the SL BSR. To be specific, when the size of the first uplink resource is sufficient to carry a complete BSR, or when the size of the first uplink resource is greater than or equal to a size of a BSR, the terminal device preferentially encapsulates the complete BSR in a UL MAC PDU on the first uplink resource.

The size of the BSR may be represented by BSR size, or the size of the BSR may be represented through a size of a BSR MAC CE, or the size of the BSR may be represented through a quantity of bits occupied by a BSR MAC CE. Alternatively, the size of the first uplink resource may be a quantity of padding bits.

It should be noted that this solution is not specifically limited to being applied to a non-padding BSR or a padding BSR.

Optionally, the size of the BSR mentioned in the present invention may be the size of the BSR MAC CE and a size of a BSR MAC CE subheader. The BSR may be a long BSR, a short BSR, or a truncated BSR.

Specifically, there may be the following several cases:

In a case 1, if the size of the first uplink resource is greater than or equal to the size of the UL BSR, the terminal device determines that the priority of the UL BSR is higher than the priority of the SL BSR. The terminal device preferentially multiplexes the UL BSR on the first uplink resource, and then optionally multiplexes the SL BSR.

In the description of this embodiment of this application, "preferentially multiplexing the UL BSR" may mean that the priority of the UL BSR is higher than that of the SL BSR in a multiplexing and encapsulation process corresponding to a MAC PDU. Alternatively, "preferentially multiplexing the UL BSR, and multiplexing the SL BSR later" may mean that the priority of the UL BSR is higher than that of the SL BSR in a multiplexing and encapsulation process. Optionally, multiplexing the SL BSR later may mean that: After the UL BSR is preferentially multiplexed, if there is a remaining resource in the first uplink resource and the remaining resource is sufficient to carry the complete SL BSR or a part of the SL BSR, the SL BSR is multiplexed. A general description is provided herein.

That the size of the first uplink resource is greater than or equal to the size of the UL BSR means that the size of the first uplink resource is greater than or equal to a size of a resource required by the complete UL BSR. The complete UL BSR may include buffer status information of one or more LCGs currently having data. The complete UL BSR may be in a short BSR format, a long BSR format, a short truncated BSR format, or a long truncated BSR format. For example, if LCGs currently having data are an LCG 1 and an LCG 2, a UL BSR MAC CE corresponding to the complete UL BSR includes information indicating buffer size fields for the LCG 1 and the LCG 2 and information about buffer sizes of the LCG 1 and the LCG 2, for example, an indication bit indicating the buffer size fields for the LCG 1 and the LCG 2 in the UL BSR MAC CE. A value of the indication bit is "1", and subsequent fields in the UL BSR MAC CE include a buffer size field 1 for the LCG 1 and a buffer size field 2 for the LCG 2.

In a case 2, if the size of the first uplink resource is greater than or equal to the size of the UL BSR, and the size of the first uplink resource is less than or equal to the size of the SL BSR, the terminal device determines that the priority of the UL BSR is higher than the priority of the SL BSR. In other words, when the first uplink resource is sufficient to carry the complete UL BSR but is insufficient to carry the complete SL BSR, the terminal device preferentially multiplexes the UL BSR on the first uplink resource, and then optionally multiplexes the SL BSR.

Different from the case 1, in the case 1, the terminal device may preferentially compare the size of the first uplink resource with the size of the UL BSR. If the first uplink resource is sufficient to carry the UL BSR, the terminal device no longer considers whether the first uplink resource is sufficient to carry the SL BSR, and directly preferentially send the UL BSR on the first uplink resource. Only when the size of the first uplink resource is insufficient to carry the UL BSR, the terminal device further determines whether the first uplink resource is sufficient to carry the SL BSR.

In a case 3, if the size of the first uplink resource is greater than or equal to a sum of the size of the UL BSR and a size of an SL BSR including buffer status information of at least one SL LCG, the terminal device determines that the priority of the UL BSR is higher than the priority of the SL BSR. In other words, the terminal device preferentially multiplexes the UL BSR on the first uplink resource, and then multiplexes the buffer status information of the at least one SL LCG. In other words, if the first uplink resource is sufficient to carry the complete UL BSR and the SL BSR including the buffer status information of the at least one SL LCG, the terminal device sends, on the first uplink resource, the complete UL BSR and the SL BSR including the buffer status information of the at least one SL LCG.

Optionally, the terminal device preferentially multiplexes the UL BSR on the first uplink resource, and then multiplexes, on a remaining uplink resource based on a size of the remaining uplink resource and a quantity of SL LCGs having to-be-transmitted data, buffer status information of one or more SL LCGs included in the SL BSR as much as possible.

In a case 4, if the size of the first uplink resource is greater than or equal to a sum of the size of the UL BSR and a size of an SL BSR including buffer status information of at least one SL LCG, and the size of the first uplink resource is less than or equal to the size of the SL BSR, the terminal device determines that the priority of the UL BSR is higher than the priority of the SL BSR. In other words, the terminal device preferentially multiplexes the UL BSR on the first uplink resource, and then multiplexes the SL BSR including the buffer status information of the at least one SL LCG.

Optionally, the terminal device preferentially multiplexes the UL BSR on the first uplink resource, and then multiplexes, on a remaining uplink resource based on a size of the remaining uplink resource and a quantity of SL LCGs having to-be-transmitted data, buffer status information of one or more SL LCGs included in the SL BSR as much as possible.

In a case 5, if the size of the first uplink resource is greater than or equal to the size of the SL BSR, the terminal device determines that the priority of the SL BSR is higher than the priority of the UL BSR, and preferentially multiplexes the SL BSR on the first uplink resource.

In a case 6, if the size of the first uplink resource is greater than or equal to a sum of the size of the SL BSR and a size of a UL BSR including buffer status information of at least one UL LCG, the terminal device determines that the priority of the SL BSR is higher than the priority of the UL BSR. In other words, the terminal device preferentially multiplexes the SL BSR on the first uplink resource, and then multiplexes the UL BSR including the buffer status information of the at least one UL LCG.

In a case 7, if the size of the first uplink resource is greater than or equal to the size of the SL BSR, and the size of the first uplink resource is less than or equal to the size of the UL BSR, the terminal device determines that the priority of the SL BSR is higher than the priority of the UL BSR. In other words, the terminal device preferentially multiplexes the SL BSR on the first uplink resource, and then multiplexes the UL BSR including the buffer status information of the at least one UL LCG.

In a case 8, if the size of the first uplink resource is greater than or equal to a sum of the size of the SL BSR and a size of a UL BSR including buffer status information of at least one UL LCG, and the size of the first uplink resource is less than or equal to the size of the UL BSR, the terminal device determines that the priority of the SL BSR is higher than the priority of the UL BSR. In other words, the terminal device preferentially multiplexes the SL BSR on the first uplink resource, and then multiplexes the UL BSR including the buffer status information of the at least one UL LCG.

For principles in the case 4 to the case 8, refer to principles in the case 1 to the case 3. Details are not described herein again.

In a case 9, the size of the first uplink resource is less than the size of the UL BSR, and the size of the first uplink resource is less than the size of the SL BSR.

In this case, in a possible implementation, the terminal device determines that the priority of the SL BSR is higher than the priority of the UL BSR. In other words, the terminal device preferentially multiplexes the SL BSR on the first uplink resource. Optionally, the terminal device multiplexes, on a remaining uplink resource in the first uplink resource based on a size of the remaining uplink resource and a quantity of SL LCGs having to-be-transmitted data, buffer status information of one or more SL LCGs included in the SL BSR as much as possible.

In this case, in another possible implementation, the terminal device alternatively determines that the priority of the UL BSR is higher than the priority of the SL BSR. In other words, the terminal device preferentially multiplexes the UL BSR on the first uplink resource.

Alternatively, in another possible implementation, in this case, the terminal determines the priority of the SL BSR and the priority of the UL BSR by using the method in FIG. 6(a), FIG. 6(b), or FIG. 6(c).

Figure 9:
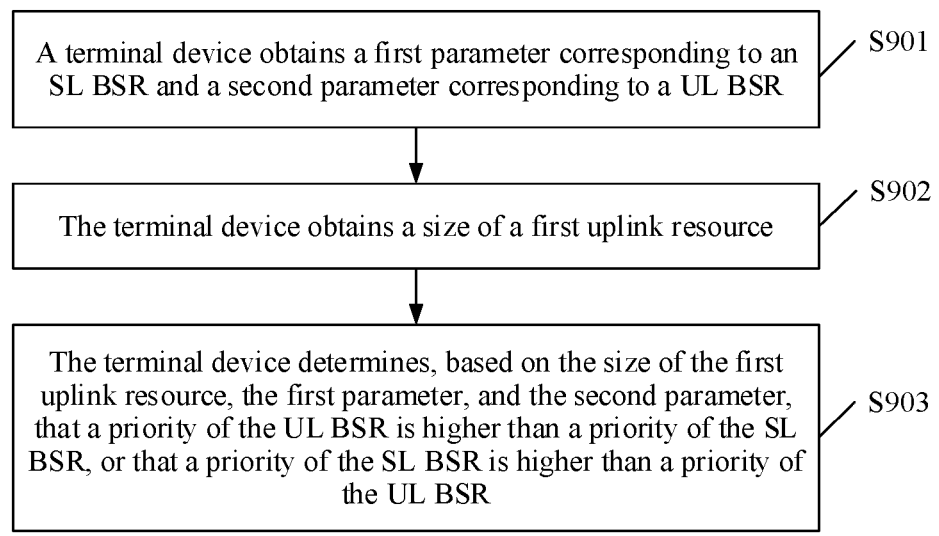

In the technical solution corresponding to FIG. 6(a), the terminal device may determine the priority of the UL BSR and the priority of the SL BSR based on the first parameter corresponding to the UL BSR and the second parameter corresponding to the SL BSR. An embodiment of this application further provides a method for reporting a buffer status report. In the method, a priority of a UL BSR and a priority of an SL BSR may be determined based on a size of a first uplink resource, a first parameter, and a second parameter. Specifically, as shown in FIG. 9, the method includes the following steps.

S901: A terminal device obtains the first parameter corresponding to the SL BSR and the second parameter corresponding to the UL BSR.

The first parameter and the second parameter may be respectively the first parameter and the second parameter in the technical solution corresponding to FIG. 6(a). To be specific, the first parameter is a priority of a sidelink service with a highest priority in one or more priorities corresponding to one or more sidelink services having sidelink data; and/or the second parameter is a priority of an uplink service with a highest priority in one or more priorities corresponding to one or more uplink services having uplink data.

Certainly, the first parameter and the second parameter may alternatively be parameters used to indicate priorities in the existing solution. A specific manner of obtaining a priority by the terminal device is not limited in this embodiment of this application. In a possible implementation, the first parameter is a priority of a sidelink service with a highest priority in priorities corresponding to sidelink services for triggering the SL BSR; and/or the second parameter is a priority of an uplink service with a highest priority in priorities corresponding to uplink services for triggering the UL BSR. For example, a priority of an LCH with a highest priority (highest LCH priority) in one or more priorities corresponding to one or more LCHs for triggering the SL BSR is considered as the first parameter corresponding to the SL BSR, and a priority of an LCH with a highest priority in one or more priorities corresponding to one or more LCHs for triggering the UL BSR is considered as the second parameter corresponding to the UL BSR.

S902: The terminal device obtains the size of the first uplink resource.

For a detailed description of S902, refer to S801. Details are not described herein again.

S901 and S902 are not sequential, or S901 and S902 may be simultaneously performed. In other words, a sequence of performing S901 and S902 is not limited.

S903: The terminal device determines, based on the size of the first uplink resource, the first parameter, and the second parameter, that the priority of the UL BSR is higher than the priority of the SL BSR, or that the priority of the SL BSR is higher than the priority of the UL BSR.

Specifically, if the size of the first uplink resource is less than a size of the SL BSR, and the size of the first uplink resource is less than a size of the UL BSR, the terminal device determines, based on the first parameter and the second parameter, that the priority of the UL BSR is higher than the priority of the SL BSR, or that the priority of the SL BSR is higher than the priority of the UL BSR. Alternatively, if the size of the first uplink resource is greater than or equal to a size of the SL BSR, and the size of the first uplink resource is greater than or equal to a size of the UL BSR, where this case includes a case in which the size of the first uplink resource is greater than or equal to the size of the SL BSR and the size of the UL BSR, namely, a case in which the first uplink resource can accommodate both the SL BSR and the UL BSR, and a case in which the first uplink resource can accommodate either the complete UL BSR or the complete SL BSR, the terminal device determines, based on the first parameter and the second parameter, that the priority of the UL BSR is higher than the priority of the SL BSR, or that the priority of the SL BSR is higher than the priority of the UL BSR. Alternatively, if the size of the first uplink resource is less than a sum of a size of the UL BSR and a size of an SL BSR including buffer status information of one SL LCG, the terminal device determines, based on the first parameter and the second parameter, that the priority of the UL BSR is higher than the priority of the SL BSR, or that the priority of the SL BSR is higher than the priority of the UL BSR.

In other cases, when a relationship between the size of the first uplink resource and the size of the SL BSR and/or the size of the UL BSR conforms to the solution in FIG. 8, the priority of the SL BSR and the priority of the UL BSR may be compared according to the solution in FIG. 8. In other words, when the first uplink resource is sufficient to carry the UL BSR, the terminal device determines that the priority of the UL BSR is higher than the priority of the SL BSR; and/or when the first uplink resource is sufficient to carry the UL BSR and the SL BSR including the buffer status information of one SL LCG, the terminal device determines that the priority of the UL BSR is higher than that of the SL BSR; and/or in other cases, the terminal device may determine, based on the second parameter corresponding to the UL BSR and the first parameter corresponding to the SL BSR, which BSR has a higher priority. For details, refer to the technical solution corresponding to FIG. 6(a).

Alternatively, when the first uplink resource is insufficient to carry the complete SL BSR, or insufficient to carry the complete UL BSR, or when the first uplink resource is sufficient to carry both the complete SL BSR and the complete UL BSR, and it cannot be determined, based on only the size of the first uplink resource, which BSR has a higher priority, the terminal device may determine, based on the second parameter corresponding to the UL BSR and the first parameter corresponding to the SL BSR, which BSR has a higher priority. Specifically, if the first parameter corresponding to the SL BSR is greater than the second parameter corresponding to the UL BSR, the terminal device determines that the priority of the SL BSR is higher than the priority of the UL BSR. If the first parameter corresponding to the SL BSR is less than or equal to the second parameter corresponding to the UL BSR, the terminal device determines that the priority of the UL BSR is higher than the priority of the SL BSR.

Figure 10A:
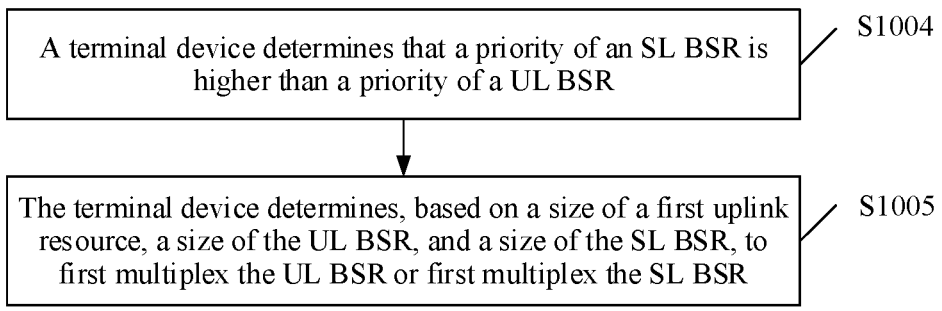
FIG. 10(a) to FIG. 10(c) are schematic flowcharts of methods for reporting a buffer status report according to embodiments of this application.

An embodiment of this application further provides a communication method. As shown in FIG. 10(a), the method includes the following steps.

S1004: A terminal device determines that a priority of an SL BSR is higher than a priority of a UL BSR.

A priority determining method may be the method corresponding to FIG. 6(a), FIG. 6(b), FIG. 6(c), FIG. 8, or FIG. 9.

S1005: The terminal device determines, based on a size of a first uplink resource, a size of the UL BSR, and a size of the SL BSR, a sequence of encapsulating the UL BSR and the SL BSR in a MAC PDU, in other words, first multiplexes the UL BSR or first multiplexes the SL BSR.

It is easily understood that, on a basis of determining that the priority of the SL BSR is higher, the terminal device further needs to consider preferentially encapsulating a specific BSR in the MAC PDU.

Specifically, if the size of the first uplink resource is greater than or equal to the size of the UL BSR, the terminal device determines to preferentially encapsulate the UL BSR in the MAC PDU, and then multiplexes the SL BSR if there is a remaining resource in the first uplink resource. Alternatively, if the size of the first uplink resource is greater than or equal to a sum of the size of the UL BSR and a size of an SL BSR including buffer status information of one SL LCG, the terminal device determines to preferentially encapsulate the UL BSR in the MAC PDU, and then multiplexes the SL BSR if there is a remaining resource. Alternatively, if the size of the first uplink resource does not satisfy the foregoing two conditions or does not satisfy either of the foregoing two conditions, the terminal device determines to encapsulate the SL BSR in the MAC PDU. Optionally, the SL BSR reports as much sidelink buffer status information as possible. For example, as many destination identifiers and/or buffer status information of SL LCGs are reported as possible based on the size of the first uplink resource and/or SL LCGs having data. Certainly, the technical solutions in the embodiments of this application are not limited thereto.

Figure 10B:
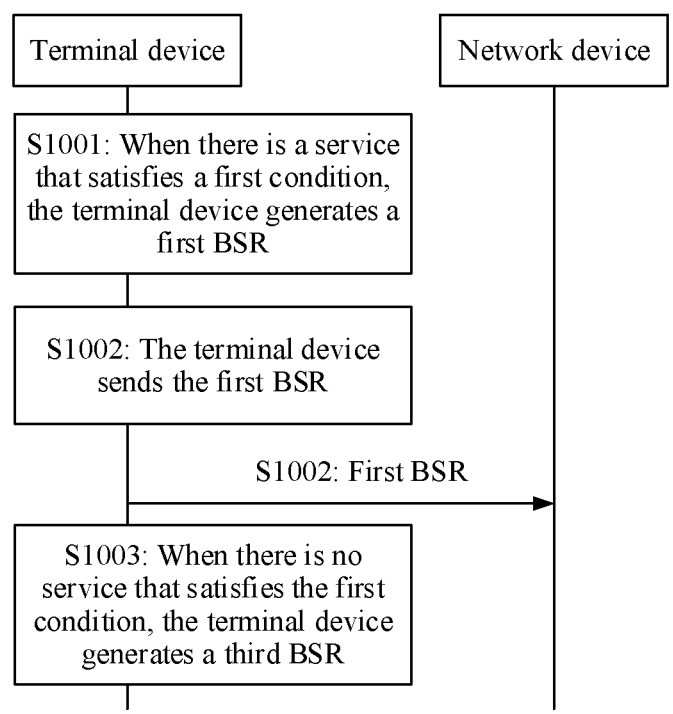

An embodiment of this application further provides a method for reporting a buffer status report. As shown in FIG. 10(b), the method includes the following steps.

S1001: If there is a service that satisfies a first condition, a terminal device generates a first BSR.

The first BSR includes buffer status information of the service that satisfies the first condition. The first condition is that a priority of the service is greater than or equal to a first threshold. In a possible implementation, the first threshold is a preconfigured value. For example, the first threshold is a value predefined in a protocol. Alternatively, the first threshold is a value preconfigured in the terminal before delivery, and optionally, the value can be subsequently updated. Alternatively, the first threshold is a value configured by a network device. Alternatively, the first threshold is the second parameter in the technical solution shown in FIG. 6(a). Herein, an existing technology or the technical solution corresponding to FIG. 6(a), FIG. 6(b), or FIG. 6(c) may be used to compare priorities of services. Alternatively, other priority comparison manners in the embodiments of this application may be used.

Optionally, the first BSR does not include buffer status information of a service that does not satisfy the first condition. In other words, the first BSR includes only the buffer status information of the service that satisfies the first condition.

The service that satisfies the first condition may be a sidelink service. In this case, the first BSR includes buffer status information of a sidelink service whose priority is greater than or equal to the first threshold.

Alternatively, the service that satisfies the first condition may be an uplink service. In this case, the first BSR includes buffer status information of an uplink service whose priority is greater than or equal to the first threshold.

Alternatively, services that satisfy the first condition may be a sidelink service and an uplink service. In this case, the first BSR includes buffer status information of an uplink service and a sidelink service whose priorities are greater than or equal to the first threshold.

Figure 11:
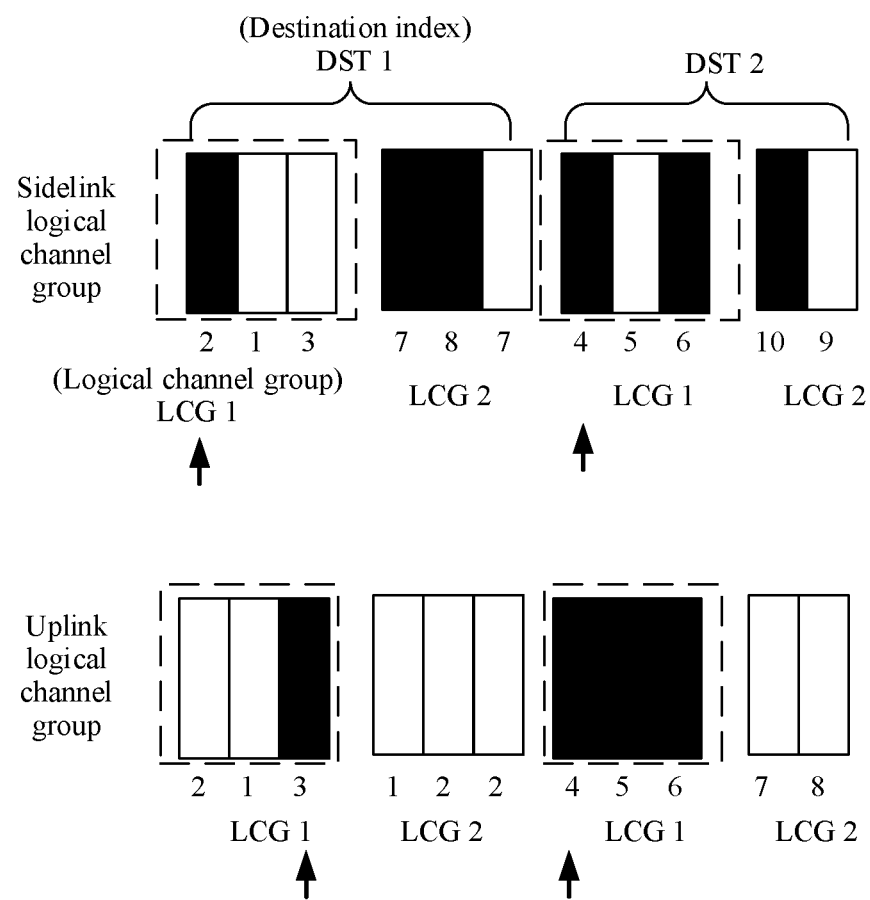
FIG. 11 is a schematic diagram of a priority comparison principle according to an embodiment of this application.

The service that satisfies the first condition includes only a sidelink service. In this case, an uplink service is an uplink logical channel, and the sidelink service is a sidelink logical channel. FIG. 11 is used as an example, and the technical solution corresponding to FIG. 6(a) is used to compare priorities of services. If the first threshold is 4, LCHs having data are SL LCHs that are filled in black and whose priority values are 2, 7, 8, 4, 6, and 10. A priority of the first SL LCH in an SL LCG 1 corresponding to a DST 1 and a priority of the first SL LCH in an SL LCG 1 corresponding to a DST 2 are greater than or equal to the first threshold. In other words, SL LCHs that satisfy the first condition are SL LCHs that are in sidelink logical channel groups and that are indicated by arrows in FIG. 11. Alternatively, SL LCGs that satisfy the first condition are SL LCGs that are in sidelink logical channel groups and that include SL LCHs indicated by arrows in FIG. 11.

The service that satisfies the first condition may include both a sidelink service and an uplink service. The uplink service is an uplink logical channel, and the sidelink service is a sidelink logical channel. FIG. 11 is used as an example, and the technical solution corresponding to FIG. 6(a) is used to compare priorities of services. If the first threshold is 4, LCHs having data are SL LCHs that are filled in black and whose priority values are 2, 7, 8, 4, 6, and 10, and UL LCHs whose priority values are 3, 4, 5, and 6. A priority of the first SL LCH in an SL LCG 1 corresponding to a DST 1 and a priority of the third UL LCH in a UL LCG 1 are greater than or equal to the first threshold. In other words, LCHs that satisfy the first condition are LCHs indicated by arrows in FIG. 11.

The service that satisfies the first condition may include both a sidelink service and an uplink service. The uplink service is an uplink logical channel group, and the sidelink service is a sidelink logical channel group. FIG. 11 is used as an example, and the technical solution corresponding to FIG. 6(a) is used to compare priorities of services. If the first threshold is 4, there are six LCGs having data in FIG. 11. A priority value of an LCG 1 corresponding to a DST 1 is 1. Likewise, a priority value of an LCG 2 corresponding to the DST 1 is 7, a priority value of an LCG 1 corresponding to a DST 2 is 4, and a priority value of an LCG 2 corresponding to the DST 2 is 9. A priority value of a UL LCG 1 is 1, and a priority value of an LCG 1 corresponding to a DST 4 is 4. In other words, LCGs whose priorities are greater than or equal to the first threshold are four LCGs indicated by the dashed-line boxes.

In a possible implementation, the first threshold may alternatively be a value determined by the terminal device based on some parameters. For example, the terminal device determines the first threshold based on a size of a first uplink resource. For example, if the first uplink resource is sufficient to carry buffer status information of four LCGs, as shown in FIG. 11, the terminal device may compare priorities of the six LCGs having data. The priority values of these LCGs are 1, 7, 4, 9, 1, and 4. In this case, the terminal device may set the first threshold to 4, to ensure that a quantity of LCGs whose priorities are greater than the first threshold is less than or equal to 5, so that the first uplink resource is sufficient to carry the buffer status information of these LCGs. Alternatively, the terminal device may compare priorities of LCHs having data. As shown in FIG. 11, priority values of these LCHs are 2, 7, 8, 4, 6, 10, 3, 4, 5, and 6. In this case, the terminal device may set the first threshold to 4, to ensure that a quantity of LCGs whose priorities are greater than the first threshold is less than or equal to 5, so that the first uplink resource is sufficient to carry the buffer status information of these LCGs.

In a possible implementation, the service that satisfies the first condition is a sidelink service or an uplink service. In this case, the first threshold may be related to a priority of a UL BSR and a priority of an SL BSR. Specifically, when the priority of the UL BSR is higher than the priority of the SL BSR, the service that satisfies the first condition is an uplink service whose service priority is greater than or equal to the first threshold. When the priority of the UL BSR is lower than the priority of the SL BSR, the service that satisfies the first condition is a sidelink service whose service priority is greater than or equal to the first threshold. Herein, the technical solution corresponding to FIG. 6(a), FIG. 6(b), or FIG. 6(c) or an existing technology may be used to compare the priority of the UL BSR with the priority of the SL BSR.

In this case, after the terminal device determines the priority of the UL BSR and the priority of the SL BSR, the terminal device may truncate a higher-priority BSR. To be specific, the terminal device limits an amount of LCG buffer status information included in the higher-priority BSR. Correspondingly, in this case, the first threshold may be a priority of a service with a highest priority in priorities corresponding to services for triggering a lower-priority BSR, or a priority of a service with a highest priority in one or more priorities corresponding to one or more services that have data and that correspond to a lower-priority BSR. Alternatively, the first threshold may be a preconfigured value, a value configured by the network device, or a value determined by the terminal device. If the priority of the UL BSR is higher than the priority of the SL BSR, the lower-priority BSR is the SL BSR; or if the priority of the UL BSR is lower than the priority of the SL BSR, the lower-priority BSR is the UL BSR.

For example, a higher-priority BSR is the SL BSR, and the first threshold is a priority of an LCH with a highest priority in priorities corresponding to LCHs that have data and that correspond to the lower-priority BSR, namely, the UL BSR. In FIG. 11, the UL LCHs having data are filled in black. A priority of the third LCH in the UL LCG 1 is the highest, and therefore the priority (the priority value is 3) of the LCH is considered as the first threshold. The LCH that satisfies the first condition is an SL LCH whose priority is greater than or equal to 3, that is, the SL LCH whose priority value is 2 shown in FIG. 11. Alternatively, an LCG that satisfies the first condition is an SL LCG including an SL LCH whose priority is greater than or equal to 3, that is, the SL LCG 1 corresponding to the DST 1 shown in FIG. 11.

For example, a higher-priority BSR is the SL BSR, and the first threshold is a priority of an LCG with a highest priority in priorities corresponding to LCGs that have pending data and that correspond to the lower-priority BSR, namely, the UL BSR. In FIG. 11, there are two UL LCGs that have pending data and that correspond to the UL BSR. If a priority (with a value of 1) of the UL LCG 1 is greater than a priority (with a value of 4) of the LCG 1 corresponding to the DST 4, the priority (with the value of 1) of the UL LCG 1 is considered as the first threshold. An LCG that satisfies the first condition is an SL LCG whose priority is greater than or equal to 1, that is, the SL LCG 1 corresponding to the DST 1 shown in FIG. 11.

S1002: The terminal device sends the first BSR.

That the terminal device sends the first BSR may be specifically implemented as follows: The terminal device sends the first BSR on the first uplink resource.

In a possible implementation, if the terminal device determines that there is an LCH that satisfies the first condition, the terminal device encapsulates, in the first BSR, an LCG including the LCH that satisfies the first condition. To be specific, FIG. 11 is still used as an example, and with reference to the foregoing examples, the terminal device encapsulates, in the first BSR, buffer status information of the LCGs (the four LCGs indicated by the dashed-line boxes) including the four LCHs indicated by the arrows. These LCGs may include both an SL LCG and a UL LCG, or include only SL LCGs, or include only UL LCGs. Then, the terminal device sends the first BSR.

In a possible implementation, if the terminal device determines that there is an LCG that satisfies the first condition, the terminal device encapsulates, in the first BSR, the LCG that satisfies the first condition. To be specific, FIG. 11 is still used as an example, and with reference to the foregoing examples, the terminal device encapsulates, in the first BSR, buffer status information of the four LCGs indicated by the dashed-line boxes. Then, the terminal device sends the first BSR.

S1003: If there is no service that satisfies the first condition, the terminal device generates/multiplexes a third BSR.

The third BSR includes a part of the buffer status information of the service that does not satisfy the first condition.

In a possible implementation, the third BSR includes a part of buffer status information of a service whose priority is less than the first threshold. For example, the first threshold is 4; priorities of sidelink services are as follows: a priority corresponding to the SL LCG 1 is 5, and a priority corresponding to an SL LCG 2 is 6; and priorities of uplink services are as follows: a priority corresponding to the UL LCG 1 is 5, and a priority corresponding to a UL LCG 2 is 7. In this case, there is no service that satisfies the first condition, and the terminal device generates the third BSR. The third BSR includes buffer status information of the four LCGs.

In a possible implementation, the third BSR includes buffer status information in a lower-priority BSR. For example, it is assumed that the priority of the SL BSR is higher than the priority of the UL BSR; priorities of sidelink services are as follows: a priority corresponding to the SL LCG 1 is 5, and a priority corresponding to an SL LCG 2 is 6; and priorities of uplink services are as follows: a priority corresponding to the UL LCG 1 is 1, and a priority corresponding to a UL LCG 2 is 7. If the first threshold is a priority of an uplink service with a highest priority in priorities corresponding to uplink services, to be specific, the first threshold is 1, there is no sidelink service that satisfies the first condition because all priorities corresponding to the SL LCGs are less than the first threshold. In this case, the terminal device generates the third BSR. The third BSR includes buffer status information of two LCGs that correspond to the lower-priority BSR, that is, the UL LCG 1 and the UL LCG 2 that correspond to the UL BSR.

It should be noted that S1004 and S1005 are not steps performed after S1003, but steps independent of S1001, S1002, and S1003.

In the existing solution, after it is determined that a priority of an SL BSR is higher than a priority of a UL BSR, an SL BSR including buffer status information of as much SL LCGs as possible is sent on the first uplink resource. In this way, the SL BSR triggered based on a low-priority service may occupy most of the first uplink resource, and the first uplink resource cannot simultaneously carry the UL BSR triggered based on a high-priority service. Consequently, transmission of the UL BSR is delayed, and transmission of uplink data with a higher priority may be delayed. According to the technical solutions in the embodiments of this application, the terminal device may send buffer status information of an LCG including an LCH with a higher service priority on the first uplink resource, or send buffer status information of an LCG with a higher service priority on the first uplink resource. These LCGs may be UL LCGs, or may be SL LCGs. In other words, the terminal device can preferentially send a BSR corresponding to a high-priority service. In this way, the network device preferentially allocates a resource for data with a higher service priority, so that the terminal device can preferentially transmit the data with the higher priority on the allocated resource. For example, in FIG. 11, according to an existing technology, if the terminal device determines that the priority of the SL BSR is higher, and the first uplink resource is sufficient to send only buffer status information of two LCGs, the terminal device sends buffer status information including as much SL LCG as possible on the first uplink resource. However, in FIG. 11, the priority (with the value of 7) of the SL LCG 2 corresponding to the DST 1 is lower than the priority (with the value of 3) of the UL LCG 1 that is not reported. As a result, a BSR including buffer status information of a low-priority service preempts a resource used for a BSR including buffer status information of a high-priority service, and the buffer status information of the high-priority service cannot be preferentially sent. However, according to the technical solutions in the embodiments of this application, the terminal device reports buffer status information of an LCG whose service priority is greater than or equal to the first threshold, or reports buffer status information of an LCG including an LCH whose service priority is greater than or equal to the first threshold, so that a BSR triggered based on a high-priority service can be preferentially sent.

In a possible implementation, the terminal device determines whether there is an LCH or an LCG that satisfies the first condition and that corresponds to a higher-priority BSR. That the higher-priority BSR is the SL BSR is used as an example. The terminal device determines whether there is an SL LCH or an SL LCG that satisfies the first condition and that corresponds to the SL BSR. FIG. 11 is still used as an example, and with reference to the foregoing examples, the terminal device encapsulates, in the first BSR, the LCG that satisfies the first condition, that is, buffer status information of the SL LCG 1 corresponding to the DST 1 shown in FIG. 11. In this way, the terminal device may report only buffer status information of a high-priority SL LCG on the first uplink resource, but does not report buffer status information of a low-priority SL LCG on the first uplink resource, to prevent the buffer status information of the low-priority SL LCG from occupying a resource used for the buffer status information of the high-priority UL LCG. This can decrease a probability that transmission of a BSR triggered based on a high-priority service is delayed, and improve data transmission efficiency.

Optionally, the first BSR includes buffer status information of a service that does not satisfy the first condition. In other words, the first BSR includes both the buffer status information of the service that satisfies the first condition and the buffer status information of the service that does not satisfy the first condition.

In this case, that a terminal device sends and generates a first BSR in S1001 may be specifically implemented as follows: The terminal device multiplexes the first BSR on the first uplink resource based on the size of the first uplink resource and a size of the lower-priority BSR.

In a possible implementation, when determining that there is an LCH that satisfies the first condition and generating a first BSR MAC CE, the terminal device determines, based on the size of the first uplink resource and the size of the lower-priority BSR, an amount of buffer status information of an LCG included in the first BSR. For example, the terminal device encapsulates, in the first BSR, buffer status information of LCGs including LCHs that satisfy the first condition. If there is buffer status information of a total of four LCGs (the four LCGs indicated by the dashed-line boxes) including LCHs, because the size of the first uplink resource is greater than a sum of a size of the buffer status information of the LCGs including the LCHs that satisfy the first condition and the size of the lower-priority BSR, the terminal device continues to include, in the first BSR in an order of priorities corresponding to LCGs (in ascending or descending order), buffer status information of LCGs including LCHs that do not satisfy the first condition.

TABLE 3

First BSR (including the buffer status information of the service that satisfies the first condition and a part of the buffer status information of the service that does not satisfy the first condition)

Optionally, as shown in Table 4, the terminal device multiplexes the lower-priority BSR. Optionally, the terminal device multiplexes a second BSR.

TABLE 4

| ... | First BSR | Lower-priority BSR | First BSR | ... |

In the foregoing implementations, if there is still a remaining resource in the first uplink resource, the terminal device may further send buffer status information of another LCG on the first uplink resource. For example, the terminal device sends the second BSR. The second BSR includes the buffer status information of the service that does not satisfy the first condition. Specifically, the second BSR includes buffer status information of a service whose service priority is less than or equal to the first threshold. If there is no remaining resource in the first uplink resource, or a remaining resource is insufficient to carry the second BSR, the terminal device may send the second BSR on a second uplink resource.

Optionally, a format of the first BSR is indicated by a first LCID, and a format of the second BSR is indicated by a second LCID. The first LCID may be different from the second LCID.

The first BSR is in, for example, but not limited to, a truncated BSR format, a short BSR format, or a long BSR format. The second BSR is in, for example, but not limited to, a truncated BSR format, a long BSR format, or a short BSR format. The truncated BSR format may be a long truncated BSR format or a short truncated BSR format.

Figure 10C:
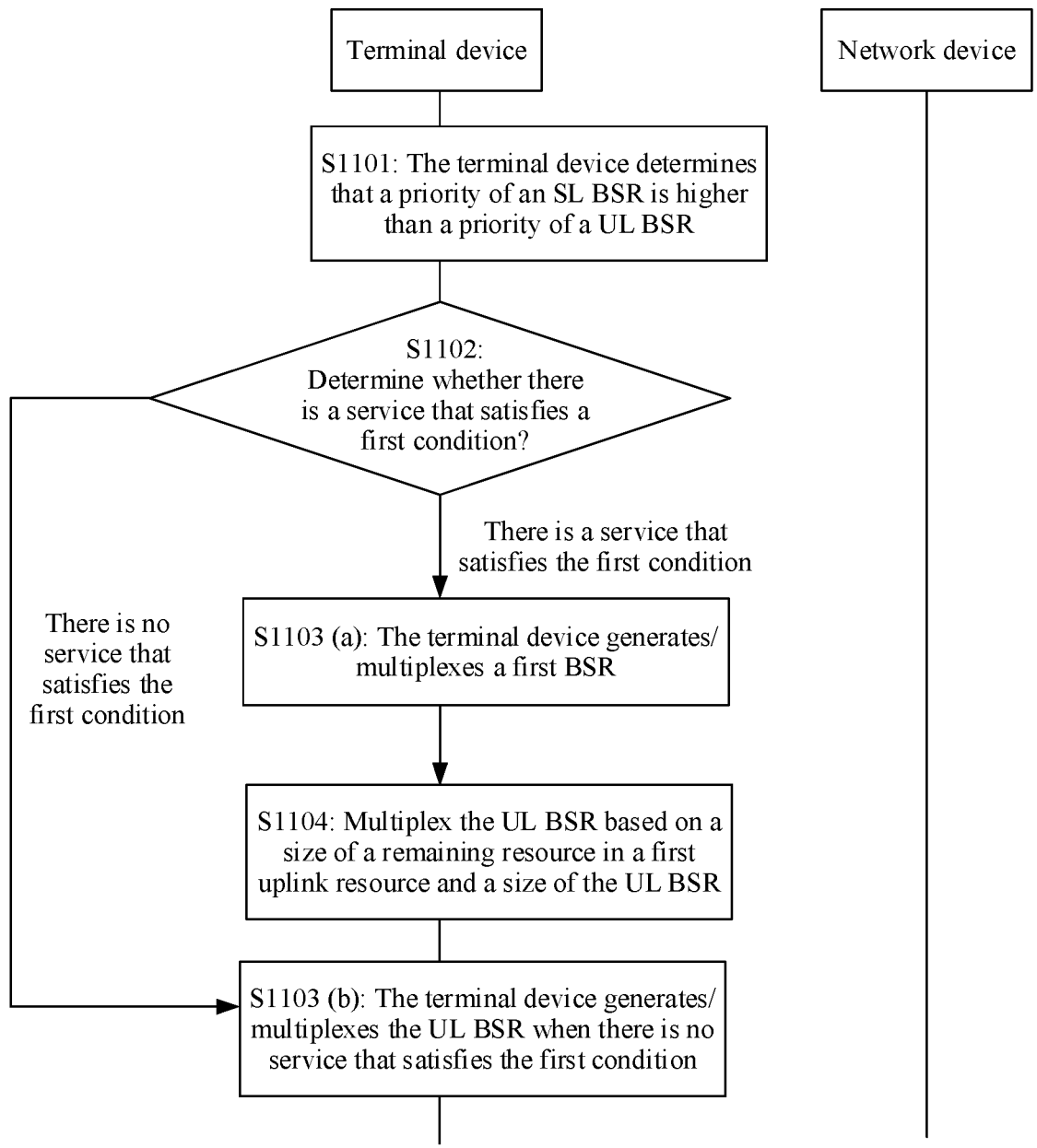

An embodiment of this application further provides a method for reporting a buffer status report. As shown in FIG. 10(c), the method includes the following steps.

S1101: A terminal device determines that a priority of an SL BSR is higher than a priority of a UL BSR.

A priority determining method may be the method corresponding to FIG. 6(a), FIG. 6(b), FIG. 6(c), FIG. 8, or FIG. 9.

S1102: The terminal device determines whether there is a service that satisfies a first condition.

S1103(a): If there is the service that satisfies the first condition, the terminal device generates/multiplexes a first BSR on a first uplink resource. The first BSR includes buffer status information of an SL LCG. To be specific, the generating/multiplexing a first BSR on a first uplink resource herein means multiplexing a high-priority SL BSR on the first uplink resource.

For specific descriptions of the first condition and the first BSR, refer to related descriptions in the technical solution corresponding to FIG. 10(b).

S1104: Multiplex the UL BSR based on a size of a remaining resource in the first uplink resource and a size of the UL BSR.

Specifically, after the SL BSR is multiplexed on the first uplink resource, if the remaining resource in the first uplink resource is sufficient to accommodate the UL BSR, the terminal device multiplexes the UL BSR. If the remaining resource is insufficient to accommodate the UL BSR, the terminal device multiplexes only the high-priority SL BSR. The SL BSR includes buffer status information of sidelink services as much as possible in a service priority order, until either of the following two conditions is satisfied: The SL BSR includes buffer status information of all services that need to be included, or there is no remaining resource in the first uplink resource.

In addition, optionally, if there is the remaining resource and the remaining resource is sufficient to accommodate other data or signaling whose priority is higher than a priority of a second BSR, the terminal device multiplexes the data and/or the other signaling, where the priority of the second BSR may be a priority of an LCH with a highest priority in LCHs included in an LCG included in the second BSR.

In addition, optionally, if there is the remaining resource and the size of the remaining resource is greater than a size of the SL BSR, a second BSR is generated. The second BSR includes as much buffer information of a service that does not satisfy the first condition as possible.

Alternatively, optionally, the first BSR includes both buffer status information of the service that satisfies the first condition and the buffer status information of the service that does not satisfy the first condition. To be specific, the first BSR includes buffer status information of services as much as possible in a priority order, until either of the following two conditions is satisfied: The first BSR includes buffer status information of all services that need to be included, or there is no remaining uplink resource. In other words, the first BSR may include content of the second BSR. In other words, if there is the remaining resource and the first BSR already includes BS information of an SL LCG/LCH that satisfies the first condition, the terminal device continues to include, in the first BSR, BS information of an LCH/LCG that has valid data and whose priority is lower than a first threshold and/or BS information of an LCH/LCG having valid data.

S1103(b): If there is no service that satisfies the first condition, the terminal device generates/multiplexes the UL BSR.

The foregoing steps may be performed in a sequence, or may be performed simultaneously.

In this embodiment, when the priority of the SL BSR is higher than the priority of the UL BSR, the SL BSR includes BSR information of an LCH/LCG whose priority is higher than the first threshold (for example, the priority of the UL BSR). If the remaining uplink resource is sufficient to accommodate the UL BSR, the UL BSR is multiplexed. When there is still a remaining resource, if an SL LCG/LCH remains left, as much as possible, BS information of an SL LCH/LCG whose priority is lower than the first threshold (for example, the priority of the UL BSR) continues to be included in the SL BSR.

The methods for reporting a buffer status report provided in the embodiments of this application are described above in detail with reference to FIG. 5 to FIG. 11. The following describes in detail a communications apparatus provided in the embodiments of this application with reference to FIG. 12.

Figure 12:
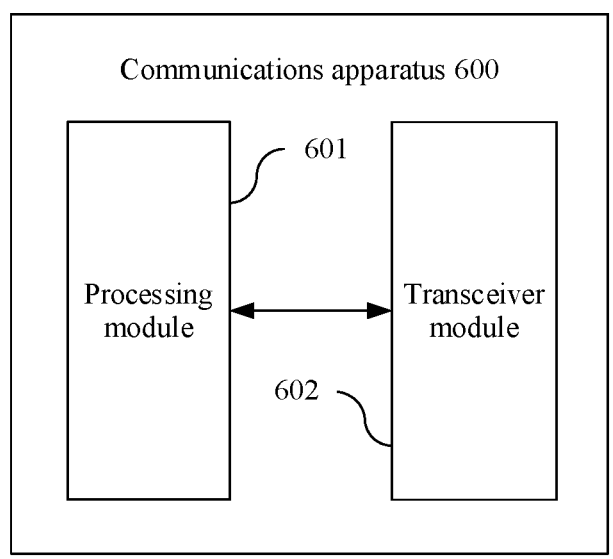
FIG. 12 is a schematic structural diagram of a communications apparatus according to an embodiment of this application.

FIG. 12 is a schematic structural diagram 2 of a communications apparatus 600 according to an embodiment of this application. The communications apparatus may be applied to the communications system shown in FIG. 3, and perform the functions of the terminal device in the method for reporting a buffer status report shown in FIG. 6(a), FIG. 6(b), FIG. 6(c), FIG. 8, FIG. 9, FIG. 10(a), FIG. 10(b), and/or FIG. 10(c). For ease of description, FIG. 12 merely shows main components of the communications apparatus.

As shown in FIG. 12, the communications apparatus 600 includes a processing module 601 and a transceiver module 602.

In this embodiment of this application, the communications apparatus 600 is applicable to the communications system shown in FIG. 3, and perform the functions of the terminal device in the method for reporting a buffer status report shown in FIG. 6(a).

The processing module is configured to: obtain a first parameter corresponding to a sidelink buffer status report SL BSR and a second parameter corresponding to an uplink buffer status report UL BSR, and determine, based on the first parameter and the second parameter, that a priority of the SL BSR is higher than a priority of the UL BSR, or that a priority of the UL BSR is higher than a priority of the SL BSR. The first parameter is related to a priority of a sidelink service having data, and the second parameter is related to a priority of an uplink service having data.

In a possible solution, the first parameter is a priority of a sidelink service with a highest priority in one or more priorities corresponding to one or more sidelink services having sidelink data; and/or the second parameter is a priority of an uplink service with a highest priority in one or more priorities corresponding to one or more uplink services having uplink data.

In a possible solution, the sidelink service includes one or more of the following: a sidelink quality of service QoS flow, a sidelink logical channel LCH, a sidelink data radio bearer DRB, a sidelink logical channel group LCG, a sidelink service destination identifier, and a sidelink packet data unit session PDU session.

The uplink service includes one or more of the following: an uplink quality of service flow, an uplink logical channel LCH, an uplink data radio bearer DRB, an uplink logical channel group LCG, an uplink service destination identifier, and an uplink packet data unit session.

In a possible solution, the sidelink service is the SL LCG, the first parameter is a priority of an SL LCG with a highest priority in one or more priorities corresponding to one or more SL LCGs having sidelink data; and/or if the uplink service is the UL LCG, the second parameter is a priority of a UL LCG with a highest priority in one or more priorities corresponding to one or more UL LCGs having uplink data.

In a possible solution, if the sidelink service is the SL LCH, the first parameter is a priority of an SL LCH with a highest priority in one or more priorities corresponding to one or more SL LCHs having sidelink data; and/or if the uplink service is the UL LCH, the second parameter is a priority of a UL LCH with a highest priority in one or more priorities corresponding to one or more UL LCHs having uplink data.

In a possible solution, that the processing module is configured to determine, based on the first parameter and the second parameter, that a priority of the SL BSR is higher than a priority of the UL BSR, or that a priority of the UL BSR is higher than a priority of the SL BSR includes: If the first parameter is greater than the second parameter, the processing module is configured to determine that the priority of the SL BSR is higher than the priority of the UL BSR; or if the first parameter is less than the second parameter, the processing module is configured to determine that the priority of the UL BSR is higher than the priority of the SL BSR.

In a possible solution, the processing module is further configured to generate a first BSR when there is a service that satisfies a first condition, where the first BSR includes buffer status information of the service that satisfies the first condition.

The transceiver module is configured to send the first BSR.

The first condition is that a priority of the service is greater than or equal to a first threshold.

In a possible solution, the first BSR does not include buffer status information of a service that does not satisfy the first condition.

In a possible solution, the first threshold includes any one of the following: a preconfigured value, a value configured by a network, a priority of a service with a highest priority in priorities corresponding to services for triggering a lower-priority BSR, or a priority of a service with a highest priority in one or more priorities corresponding to one or more services that have data and that correspond to a lower-priority BSR.

If the priority of the UL BSR is higher than the priority of the SL BSR, the lower-priority BSR is the SL BSR; or if the priority of the UL BSR is lower than the priority of the SL BSR, the lower-priority BSR is the UL BSR.

In a possible solution, the transceiver module is further configured to send a second BSR, where the second BSR includes the buffer status information of the service that does not satisfy the first condition.

In some other embodiments, the communications apparatus 600 is applicable to the communications system shown in FIG. 3, and perform the functions of the terminal device in the method for reporting a buffer status report shown in FIG. 8 and/or FIG. 9.

The processing module is configured to: obtain a size of a first uplink resource, and determine, based on the size of the first uplink resource, that a priority of a UL BSR is higher than a priority of an SL BSR, or that a priority of an SL BSR is higher than a priority of a UL BSR.

In a possible solution, that the processing module is configured to determine, based on the size of the first uplink resource, that a priority of a UL BSR is higher than a priority of an SL BSR includes: If the size of the first uplink resource is greater than or equal to a size of the UL BSR, or the size of the first uplink resource is greater than or equal to a sum of a size of the UL BSR and a size of an SL BSR including buffer status information of at least one SL LCG, or the size of the first uplink resource is greater than or equal to a size of the UL BSR and the size of the first uplink resource is less than or equal to a size of the SL BSR, or the size of the first uplink resource is greater than or equal to a sum of a size of the UL BSR and a size of an SL BSR including buffer status information of at least one SL LCG, and the size of the first uplink resource is less than or equal to the size of the SL BSR, the processing module is configured to determine that the priority of the UL BSR is higher than the priority of the SL BSR.

In a possible solution, that the processing module is configured to determine, based on the size of the first uplink resource, that a priority of an SL BSR is higher than a priority of a UL BSR includes: If the size of the first uplink resource is greater than or equal to a size of the SL BSR, or the size of the first uplink resource is greater than or equal to a sum of a size of the SL BSR and a size of a UL BSR including buffer status information of at least one UL LCG, or the size of the first uplink resource is greater than or equal to a size of the SL BSR and the size of the first uplink resource is less than or equal to a size of the UL BSR, or the size of the first uplink resource is greater than or equal to a sum of a size of the SL BSR and a size of a UL BSR including buffer status information of at least one UL LCG, and the size of the first uplink resource is less than or equal to the size of the UL BSR, the processing module is configured to determine that the priority of the SL BSR is higher than the priority of the UL BSR.

In a possible solution, the processing module is further configured to obtain a first parameter corresponding to the SL BSR and a second parameter corresponding to a UL BSR.

The first parameter is a priority of a sidelink service with a highest priority in one or more priorities corresponding to one or more sidelink services having sidelink data; and/or the second parameter is a priority of an uplink service with a highest priority in one or more priorities corresponding to one or more uplink services having uplink data.

Alternatively, the first parameter is a priority of a sidelink service with a highest priority in priorities corresponding to sidelink services for triggering the SL BSR; and/or the second parameter is a priority of an uplink service with a highest priority in priorities corresponding to uplink services for triggering the UL BSR.

That the processing module is configured to determine, based on the size of the first uplink resource, that a priority of a UL BSR is higher than a priority of an SL BSR, or that a priority of an SL BSR is higher than a priority of a UL BSR includes: The processing module is configured to determine, based on the size of the first uplink resource, the first parameter, and the second parameter, that the priority of the UL BSR is higher than the priority of the SL BSR, or that the priority of the SL BSR is higher than the priority of the UL BSR.

In a possible solution, that the processing module is configured to determine, based on the size of the first uplink resource, the first parameter, and the second parameter, that the priority of the UL BSR is higher than the priority of the SL BSR, or that the priority of the SL BSR is higher than the priority of the UL BSR includes: If the size of the first uplink resource is less than a size of the SL BSR and less than a size of the UL BSR, the processing module is configured to determine, based on the first parameter and the second parameter, that the priority of the UL BSR is higher than the priority of the SL BSR, or that the priority of the SL BSR is higher than the priority of the UL BSR.

Alternatively, if the size of the first uplink resource is greater than or equal to a size of the SL BSR and greater than or equal to a size of the UL BSR, the terminal device determines, based on the first parameter and the second parameter, that the priority of the UL BSR is higher than the priority of the SL BSR, or that the priority of the SL BSR is higher than the priority of the UL BSR.

In a possible solution, that the processing module is configured to determine, based on the first parameter and the second parameter, that the priority of the UL BSR is higher than the priority of the SL BSR, or that the priority of the SL BSR is higher than the priority of the UL BSR includes: If the first parameter corresponding to the SL BSR is greater than the second parameter corresponding to the UL BSR, the processing module is configured to determine that the priority of the SL BSR is higher than the priority of the UL BSR; or if the first parameter corresponding to the SL BSR is less than the second parameter corresponding to the UL BSR, the processing module is configured to determine that the priority of the UL BSR is higher than the priority of the SL BSR.

In some other embodiments, the communications apparatus 600 is applicable to the communications system shown in FIG. 3, and perform the functions of the terminal device in the method for reporting a buffer status report shown in FIG. 10(b).

The processing module is configured to generate a first BSR. The transceiver module is configured to send the first BSR. The first BSR includes buffer status information of a service that satisfies a first condition. The first condition is that a priority of the service is greater than or equal to a first threshold.

In a possible solution, the first BSR does not include buffer status information of a service that does not satisfy the first condition.

In a possible solution, the first threshold includes any one of the following: a preconfigured value, a value configured by a network device, a priority of a service with a highest priority in priorities corresponding to services for triggering a lower-priority BSR, or a priority of a service with a highest priority in one or more priorities corresponding to one or more services that have data and that correspond to a lower-priority BSR. In this case, if a priority of a UL BSR is higher than a priority of an SL BSR, the lower-priority BSR is the SL BSR; or if a priority of a UL BSR is lower than a priority of an SL BSR, the lower-priority BSR is the UL BSR.

In a possible solution, the transceiver module is further configured to send a second BSR, where the second BSR includes the buffer status information of the service that does not satisfy the first condition.

Optionally, the communications apparatus 600 in FIG. 12 may further include a storage module. The storage module stores a program or an instruction. When the processing module executes the program or the instruction, the communications apparatus 600 is enabled to perform the functions of the terminal device in any one of the foregoing methods for reporting a buffer status report.

It should be noted that the communications apparatus 600 may be a terminal device, a chip or a chip system disposed in a terminal device, or another type of component having a terminal function. This is not limited in this application.

In a possible implementation, the processing module may be located in the processor shown in FIG. 4, or may include a processor and another necessary component. The transceiver module may be the transceiver 203 shown in FIG. 4, or may be another transceiver circuit or the like. The storage module may be the memory 202 shown in FIG. 4.

An embodiment of this application provides a communications apparatus. The communications apparatus is configured to implement the foregoing method for reporting a buffer status report. The communications apparatus may be the terminal device, for example, an in-vehicle communications apparatus, an apparatus including the terminal device, for example, various types of vehicles, or an apparatus or a component included in the terminal device, for example, a system chip, in the method for reporting a buffer status report in the foregoing method embodiments. The communications apparatus includes a corresponding module, unit, or means for implementing the method for reporting a buffer status report. The module, unit, or means may be implemented by hardware, software, or hardware executing corresponding software. The hardware or the software includes one or more modules or units corresponding to the functions.

An embodiment of this application provides a chip system. The chip system includes a processor and an input/output port. The processor is configured to implement a processing function of the method for reporting a buffer status report in the foregoing method embodiments. The input/output port is configured to implement a transceiving function of the method for reporting a buffer status report in the foregoing method embodiments.

In a possible solution, the chip system further includes a memory. The memory is configured to store a program instruction and data for implementing a function of the method for reporting a buffer status report according to the first aspect to the third aspect.

The chip system may include a chip, or may include a chip and another discrete component.

An embodiment of this application provides a computer-readable storage medium. The computer-readable storage medium stores a computer instruction. When the computer instruction is run on a computer, the computer is enabled to perform the method for reporting a buffer status report in the foregoing method embodiments.

An embodiment of this application provides a computer program product including an instruction. The computer program product includes a computer program or an instruction. When the computer program or the instruction is run on a computer, the computer is enabled to perform the method for reporting a buffer status report in the foregoing method embodiments.

It should be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory in the embodiments of this application may be a volatile memory or a nonvolatile memory, or may include a volatile memory and a nonvolatile memory. For example, the nonvolatile memory may be a read-only memory (ROM), a programmable read-only memory (PROM), an erasable programmable read-only memory (erasable PROM or EPROM), an electrically erasable programmable read-only memory (electrically EPROM or EEPROM), or a flash memory. The volatile memory may be a random access memory (RAM), and used as an external cache. Through examples but not limitative descriptions, random access memories (RAM) in many forms may be used, for example, a static random access memory (static RAM or SRAM), a dynamic random access memory (dynamic random access memory or DRAM), a synchronous dynamic random access memory (synchronous DRAM or SDRAM), a double data rate synchronous dynamic random access memory (double data rate SDRAM or DDR SDRAM), an enhanced synchronous dynamic random access memory (enhanced SDRAM or ESDRAM), a synchronous link dynamic random access memory (synchlink DRAM or SLDRAM), and a direct rambus dynamic random access memory (direct rambus RAM or DR RAM).

All or some of the foregoing embodiments may be implemented by software, hardware (for example, circuit), firmware, or any combination thereof. When software is used to implement the embodiments, the foregoing embodiments may be implemented all or partially in a form of a computer program product. The computer program product includes one or more computer instructions or computer programs. When the program instructions or the computer programs are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent three cases: There is only A, there are both A and B, and there is only B. A and B may be singular or plural. In addition, the character "/" in this specification generally represents an "or" relationship between associated objects, or may alternatively represent an "and/or" relationship. For details, refer to foregoing and following descriptions for understanding.

In this application, "at least one" means one or more, and "a plurality of" means two or more. "At least one of the following items (pieces)" or a similar expression means any combination of the items, including any combination of singular items (pieces) or plural items (pieces). For example, at least one (piece) of a, b, or c may indicate: a, b, c, a and b, a and c, b and c, or a, b, and c, where a, b, and c may be singular or plural.

It should be understood that sequence numbers of the foregoing processes do not mean execution sequences in the embodiments of this application. The execution sequences of the processes should be determined based on functions and internal logic of the processes, and should not be construed as any limitation to the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the existing solution, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method performed by a terminal device or by a chip of the terminal device, comprising:
sending a first buffer status report (BSR), wherein the first BSR comprises first buffer status information of at least a first sidelink (SL) logical channel group (LCG), wherein the first SL LCG satisfies a first condition, and wherein the first condition is that the first SL LCG comprises a first SL logical channel (LCH) containing first SL data and that a first priority of the first SL LCH is greater than a first threshold,
wherein a first multiplexing priority of the first BSR is higher than a third multiplexing priority of a third BSR, wherein the third BSR comprises third buffer status information of at least a third LCG, the third LCG comprising at least a third LCH containing uplink (UL) data, wherein the third multiplexing priority of the third BSR is higher than a second multiplexing priority of a second BSR, wherein the second BSR comprises second buffer status information of at least a second SL LCG, wherein a second priority of a second SL LCH is lower than the first threshold, and wherein the second priority of the second SL LCH is a highest priority in one or more priorities corresponding to one or more SL LCHs containing second SL data and belonging to the second SL LCG.

2. A communications apparatus, comprising:
a memory; and
at least one processor, wherein the at least one processor is coupled to the memory, the memory is configured to store a computer program, and the at least one processor is configured to execute the computer program stored in the memory, to enable the communications apparatus to perform operations comprising:
sending a first buffer status report (BSR), wherein the first BSR comprises first buffer status information of at least a first sidelink (SL) logical channel group (LCG), wherein the first SL LCG satisfies a first condition, and wherein the first condition is that the first SL LCG comprises a first SL logical channel (LCH) containing first SL data and that a first priority of the first SL LCH is greater than a first threshold,
wherein a first multiplexing priority of the first BSR is higher than a third multiplexing priority of a third BSR, wherein the third BSR comprises third buffer status information of at least a third LCG, the third LCG comprising at least a third LCH containing uplink (UL) data, wherein the third multiplexing priority of the third BSR is higher than a second multiplexing priority of a second BSR, wherein the second BSR comprises second buffer status information of at least a second SL LCG, wherein a second priority of a second SL LCH is lower than the first threshold, and wherein the second priority of the second SL LCH is a highest priority in one or more priorities corresponding to one or more SL LCHs containing second SL data and belonging to the second SL LCG.

3. A non-transitory computer readable storage medium storing programming, the programming including instructions to cause an apparatus to perform operations, the operations comprising:
sending a first buffer status report (BSR), wherein the first BSR comprises first buffer status information of at least a first sidelink (SL) logical channel group (LCG), wherein the first SL LCG satisfies a first condition, and wherein the first condition is that the first SL LCG comprises a first SL logical channel (LCH) containing first SL data and that a first priority of the first SL LCH is greater than a first threshold,
wherein a first multiplexing priority of the first BSR is higher than a third multiplexing priority of a third BSR, wherein the third BSR comprises third buffer status information of at least a third LCG, the third LCG comprising at least a third LCH containing uplink (UL) data, wherein the third multiplexing priority of the third BSR is higher than a second multiplexing priority of a second BSR, wherein the second BSR comprises second buffer status information of at least a second SL LCG, wherein a second priority of a second SL LCH is lower than the first threshold, and wherein the second priority of the second SL LCH is a highest priority in one or more priorities corresponding to one or more SL LCHs containing second SL data and belonging to the second SL LCG.

4. The method according to claim 1, wherein the method further comprises:
based on a size of a first uplink resource, a size of the third BSR, and a size of the first BSR, prioritizing the first BSR over the third BSR.

5. The method according to claim 4, wherein the prioritizing comprises:
based on that the size of the first uplink resource is less than a sum of a size of a third BSR medium access control control element (MAC CE) corresponding to the third BSR, a size of a subheader of the third BSR MAC CE, a size of a first BSR MAC CE corresponding to the first BSR, and a size of a subheader of the first BSR MAC CE, prioritizing the first BSR over the third BSR.

6. The method according to claim 4, wherein buffer status information for as many of the at least the first SL LCG as possible are reported based on at least one of: the size of the first uplink resource, or, a size of the at least the first SL LCG having data available for transmission.

7. The method according to claim 1, wherein the first BSR is a truncated SL BSR.

8. The method according to claim 5, wherein the method further comprises:
preferentially encapsulating the first BSR MAC CE and the subheader of the first BSR MAC CE in a UL MAC protocol data unit (PDU) to the third BSR MAC CE.

9. The method according to claim 5, wherein the size of the first BSR is a sum of the size of the first BSR MAC CE and the size of the subheader of the first BSR MAC CE.

10. The method according to claim 1, wherein the first priority of the first SL LCH is a highest priority in one or more priorities corresponding to one or more SL LCHs included in the first SL LCG.

11. The communication apparatus according to claim 2, the operations further comprising:
based on a size of a first uplink resource, a size of the third BSR, and a size of the first BSR, prioritizing the first BSR over the third BSR.

12. The communication apparatus according to claim 11, wherein the prioritizing, comprises:
based on that the size of the first uplink resource is less than a sum of a size of a third BSR medium access control control element (MAC CE) corresponding to the third BSR, a size of a subheader of the third BSR MAC CE, a size of a first BSR MAC CE corresponding to the first BSR, and a size of a subheader of the first BSR MAC CE, prioritizing the first BSR over the third BSR.

13. The communication apparatus according to claim 11, wherein buffer status information for as many of the at least the first SL LCG as possible are reported based on at least one of: the size of the first uplink resource, or, a size of the at least the first SL LCG having data available for transmission.

14. The communication apparatus according to claim 2, wherein the first BSR is a truncated SL BSR.

15. The communication apparatus according to claim 2, wherein the first priority of the first SL LCH is a highest priority in one or more priorities corresponding to one or more SL LCHs included in the first SL LCG.

16. The non-transitory computer readable storage medium according to claim 3, the operations further comprising:
based on a size of a first uplink resource, a size of the third BSR, and a size of the first BSR, prioritizing the first BSR over the third BSR.

17. The non-transitory computer readable storage medium according to claim 16, wherein the prioritizing comprises: based on that the size of the first uplink resource is less than a sum of a size of a third BSR medium access control control element (MAC CE) corresponding to the third BSR, a size of a subheader of the third BSR MAC CE, a size of a first BSR MAC CE corresponding to the third BSR, and a size of a subheader of the first BSR MAC CE corresponding to the first BSR, prioritizing the first BSR over the third BSR.

18. The non-transitory computer readable storage medium according to claim 16, wherein buffer status information for as many of the at least the first SL LCG as possible are reported based on at least one of: the size of the first uplink resource, a size of the at least the first SL LCG having data available for transmission.

19. The non-transitory computer readable storage medium according to claim 3, wherein the first BSR is a truncated SL BSR.

20. The non-transitory computer readable storage medium according to claim 3, wherein the first priority of the first SL LCH is a highest priority in one or more priorities corresponding to one or more SL LCHs included in the first SL LCG.

\* \* \* \* \*

UNITED STATES PATENT AND TRADEMARK OFFICE
CERTIFICATE OF CORRECTION

| | | |
|---|---|---|
| PATENT NO. | : 12,309,783 B2 | Page 1 of 1 |
| APPLICATION NO. | : 17/656980 | |
| DATED | : May 20, 2025 | |
| INVENTOR(S) | : Yu et al. | |

It is certified that error appears in the above-identified patent and that said Letters Patent is hereby corrected as shown below:

In the Specification

In Column 13, Line 18, delete "ABSR" and insert -- A BSR --.

In Column 24, Line 60, delete ""i"" and insert -- "1" --.

Signed and Sealed this
Twenty-fourth Day of June, 2025

Coke Morgan Stewart
*Acting Director of the United States Patent and Trademark Office*